(12) United States Patent
Tian et al.

(10) Patent No.: US 8,676,378 B2
(45) Date of Patent: Mar. 18, 2014

(54) ROBOT WITH DOCKING STATION, SYSTEM AND METHOD

(75) Inventors: Jiaofeng Tian, Jiangsu Province (CN); Chang Zhou, Jiangsu Province (CN); Fangshi Liu, Jiangsu Province (CN)

(73) Assignee: Positec Power Tools (Suzhou) Co., Ltd., Suzhou, Jiangsu Province (CN)

( * ) Notice: Subject to any disclaimer, the term of this patent is extended or adjusted under 35 U.S.C. 154(b) by 0 days.

(21) Appl. No.: 13/550,101

(22) Filed: Jul. 16, 2012

(65) Prior Publication Data

US 2013/0006418 A1 Jan. 3, 2013

Related U.S. Application Data

(63) Continuation of application No. PCT/CN2011/083133, filed on Nov. 29, 2011.

(30) Foreign Application Priority Data

| Nov. 30, 2010 | (CN) | 2010 1 0568704 |
| Nov. 30, 2010 | (CN) | 2010 1 0568706 |
| Nov. 30, 2010 | (CN) | 2010 1 0568707 |
| Nov. 30, 2010 | (CN) | 2010 1 0568709 |

(51) Int. Cl.
*G06F 19/00* (2011.01)
*B25J 9/22* (2006.01)
*H02J 7/00* (2006.01)
*E01H 1/08* (2006.01)

(52) U.S. Cl.
USPC ............ 700/245; 901/1; 901/46; 318/568.12; 320/109; 15/340.1

(58) Field of Classification Search
USPC .................... 700/245–264; 901/1; 318/568.12–568.14, 587; 320/107–115; 15/319, 340.1
See application file for complete search history.

(56) References Cited

U.S. PATENT DOCUMENTS 5,324,948 A 6/1994 Dudar et al.
5,440,216 A 8/1995 Kim (Continued)

FOREIGN PATENT DOCUMENTS

EP 1302147 B1 8/2004

*Primary Examiner* — Khoi Tran
*Assistant Examiner* — Abby Lin
(74) *Attorney, Agent, or Firm* — John F. Salazar; Middleton Reutlinger

(57) ABSTRACT

A robot, a station, system and method therefor is described. The docking system includes, among other items, a robot and a docking station. The robot may have a power storage unit configured to supply power for the robot, a docking terminal group having a first docking terminal and a second docking terminal, and a robot control unit configured to control working state of the robot. The docking station includes a conductive terminal group comprising at least a first conductive terminal and a second conductive terminal. The conductive terminal group is configured to be electrically connected to the docking terminal group respectively. The robot control unit comprises a signal transmission module configured to be electrically connected to the first docking terminal and send a predetermined detection signal, a signal receiving module configured to be electrically connected to the second docking terminal. When the signal receiving module receives a predetermined feedback signal corresponding to the predetermined detection signal, the robot control unit verifies that the docking of the docking terminal group of the robot with the conductive terminal group of the docking station has succeeded. The robot can reliably dock to the docking station without human intervention, which brings extreme convenience to production and life.

20 Claims, 6 Drawing Sheets

(56) References Cited

U.S. PATENT DOCUMENTS

| | | | |
|---|---|---|---|
| 5,838,142 A * | 11/1998 | Wyss et al. .................... 320/148 |
| 5,959,423 A | 9/1999 | Nakanishi et al. |
| 6,076,226 A | 6/2000 | Reed |
| 6,525,509 B1 | 2/2003 | Petersson et al. |
| 6,586,908 B2 | 7/2003 | Petersson et al. |
| 6,888,338 B1 * | 5/2005 | Popescu-Stanesti et al. . 320/137 |
| 7,729,801 B2 * | 6/2010 | Abramson .................... 700/245 |
| 2010/0064974 A1 * | 3/2010 | Van Den Berg et al. ... 119/14.02 |

* cited by examiner

ROBOT WITH DOCKING STATION, SYSTEM AND METHOD

CROSS-REFERENCE TO RELATED APPLICATIONS

This application is a continuation filed under 35 U.S.C. §111(a) of, currently pending, PCT Patent Application No. PCT/CN2011/083133 filed on Nov. 29, 2011 which claims priority to Chinese Patent Application No. 201010568704.0 filed on Nov. 30, 2010, and to Chinese Patent Application No. 201010568706.X filed on Nov. 30, 2010, and to Chinese Patent Application No. 201010568709.3 filed on Nov. 30, 2010 and to Chinese Patent Application No. 201010568707.4 filed on Nov. 30, 2010.

TECHNICAL FIELD

The present description relates to a robot and to a docking station. More particularly, various docking systems including a robot and a docking station are described herein. Further, the system also includes a method for automatic docking of a robot with a docking station.

BACKGROUND

Intelligent robots are frequently utilized for various endeavors. Robots can implement predetermined tasks without manual operation and interference according to the predetermined programs and therefore are widely applied to industrial and household activities. These tasks and activities include various functions, such as lawn movers, vacuum cleaners and the like. Intelligent robots can be a great time saver and provide conveniences to industrial production and household living. Older style robots use a power storage unit to supply power but when the battery power in the power storage unit is exhausted, the robot discontinues operation. When this occurs, someone will have to move the robot to the docking station to allow recharging of the power storage unit. In some circumstances, battery recharging may take several hours requiring that the robot be down and unused for this time. To overcome the mentioned problems, a system and a method for automatic docking of the robots and docking station must be developed.

SUMMARY

The present invention provides a docking system for a robot to docking to a docking station. The docking system comprises a robot and a docking station. The robot comprises a power storage unit configured to supply power for the robot, a docking terminal group comprising at least a first docking terminal and a second docking terminal, and a robot control unit configured to control working state of the robot. The docking station comprises a conductive terminal group comprising at least a first conductive terminal and a second conductive terminal. The conductive terminal group is configured to be electrically connected to the docking terminal group respectively. The robot control unit comprises a signal transmission module configured to be electrically connected to the first docking terminal and send a predetermined detection signal, a signal receiving module configured to be electrically connected to the second docking terminal. When the signal receiving module receives a predetermined feedback signal corresponding to the predetermined detection signal, the robot control unit verifies that the docking of the docking terminal group of the robot with the conductive terminal group of the docking station has succeeded.

Preferably, the predetermined detection signal and the predetermined feedback signal are regular variable signals.

Preferably, the predetermined detection signal and the predetermined feedback signal have the same period.

Preferably, the predetermined detection signal and the predetermined feedback signal are square wave signals and have the same period.

Preferably, the robot also includes at least one of a first signal conversion unit and a second signal conversion unit, the first signal conversion unit is set between the signal transmission module and the first docking terminal, the second signal conversion unit is set between the signal receiving module and the second docking terminal, the first signal conversion unit and the second signal conversion unit can change electrical parameters of signal passing therethrough.

Preferably, the first signal conversion unit and the second signal conversion unit amplify or decrease the signals passing therethrough.

Preferably, the robot includes the first signal conversion unit and the second signal conversion unit, the first signal conversion unit amplifies the signal passing therethrough, the second signal conversion unit decreases the signal passing therethrough.

Preferably, the second signal conversion unit isolates electrical signal transferred between the second docking terminal and the signal receiving module.

Preferably, after verifying that the docking of the docking terminal group in the robot and the conductive terminal group in the docking station has succeeded, the robot control unit controls robot stopping moving.

Preferably, after the robot stops moving, the signal transmission module sends a predetermined detection signal again, if the signal receiving module receives a predetermined feedback signal corresponding to the predetermined detection signal, the robot control unit controls the robot keeping the status of stopped movement, if the signal receiving module does not receive a predetermined feedback signal corresponding to the predetermined detection signal, the robot control unit controls the robot beginning to move.

Preferably, the docking station also includes an across circuit set between the first conductive terminal and the second conductive terminal, the across circuit transfers signal between the first conductive terminal and the second conductive terminal.

Preferably, the docking station also includes a docking station control unit, the docking station control unit controls working state of the docking station and detects signal transferred between the first conductive terminal and the second conductive terminal, when docking station control unit detects a predetermined startup signal corresponding to the predetermined detection signal, docking station control unit controls docking station to begin charging process.

Preferably, the predetermined startup signal is a regular variable square wave signal.

Preferably, the predetermined startup signal is a square wave having a predetermined period.

Preferably, the docking station also includes a signal detection unit which is set between the docking station control unit and the first and second conductive terminals, the docking station control unit detects signal transferred between the first conductive terminal and the second conductive terminal through the signal detection unit.

Preferably, the signal detection unit changes electrical parameters of signal passing therethrough.

Preferably, the signal detection unit decreases the signal passing therethrough.

Preferably, the signal detection unit isolates electrical signal transferred between the conductive terminal group and docking station control unit.

Preferably, the docking station also includes an output power control unit which permits or prevents providing charging power to the first conductive terminal and the second conductive terminal, before beginning charging process, the docking station control unit controls the output power control unit preventing providing charging power to the first conductive terminal and the second conductive terminal, the output power of the first conductive terminal and the second conductive terminal is zero, after beginning charging process, the docking station control unit controls the output power control unit permitting providing charging power to the first conductive terminal and the second conductive terminal, the first conductive terminal and the second conductive terminal output the charging power.

Preferably, the robot also includes a storage power detection unit which detects power level of the power storage unit and transfers the detected signal to the robot control unit, when the power level is less than a predetermined level, the robot control unit controls the robot returning to the docking station.

Preferably, the robot also includes a forced charging assembly which operatively sends a charging order signal to the robot control unit, when the forced charging assembly sends a charging order signal, the robot control unit controls the robot returning to the docking station.

Preferably, the robot also includes a rain detector which sends a detected signal to the robot control unit, when the rain detector detects rain, the robot control unit controls the robot returning to the docking station.

Preferably, the docking system also includes a boundary wire, the docking station electrically connects with the boundary wire, the robot goes along the boundary wire to return to the docking station.

Preferably, the robot is a lawn mower and includes a cutting assembly operable to cut grass.

The present invention also provides another docking system comprising a robot and a docking station. The robot comprises a docking terminal group comprising at least a first docking terminal and a second docking terminal. The docking station comprises a conductive terminal group comprising at least a first conductive terminal and a second conductive terminal, the conductive terminal group configured to be electrically connected to the docking terminal group respectively. The robot also comprises a signal transmission module configured to be electrically connected to the first docking terminal and send out a predetermined detection signal through the first docking terminal; a signal receiving module configured to receive signal from the second docking terminal. When the signal receiving module receives a predetermined feedback signal corresponding to the predetermined detection signal, the robot verifies that the docking of the docking terminal group of the robot with the conductive terminal group of the docking station has succeeded.

Preferably, the predetermined detection signal and the predetermined feedback signal are regular variable signals.

Preferably, the predetermined detection signal and the predetermined feedback signal have same period.

Preferably, the predetermined detection signal and the predetermined feedback signal are square wave signals and have same period.

The present invention also provides another docking system comprising a robot and a docking station. The robot comprises a docking terminal group comprising at least a first docking terminal and a second docking terminal. The docking station comprises a conductive terminal group which comprises at least a first conductive terminal and a second conductive terminal, the conductive terminal group configured to be electrically connected to the docking terminal group respectively. The robot sends out a predetermined detection signal through the first docking terminal and receives signal from the second docking terminal. When the robot receives a predetermined feedback signal corresponding to the predetermined detection signal, the robot verifies that the docking of the docking terminal group of the robot with the conductive terminal group of the docking station has succeeded.

Preferably, the predetermined detection signal and the predetermined feedback signal are regular variable signals.

Preferably, the predetermined detection signal and the predetermined feedback signal have same period.

Preferably, the predetermined detection signal and the predetermined feedback signal are square wave signals and have same period.

The present invention also provides a docking method for docking a robot to a docking station. The robot comprises a docking terminal group and a robot control unit. The docking terminal group comprises at least a first docking terminal and a second docking terminal. The robot control unit comprises a signal transmission module configured to be electrically connected to the first docking terminal and a signal receiving module configured to be electrically connected to the second docking terminal. The docking station comprises a conductive terminal group. The conductive terminal group comprises at least a first conductive terminal and a second conductive terminal. The conductive terminal group is configured to be electrically connected to the docking terminal group respectively. The docking method comprises the steps of the signal transmission module sending out a predetermined detection signal; determining if the signal receiving module has received a predetermined feedback signal corresponding to the predetermined detection signal; when the signal receiving module has received a predetermined feedback signal corresponding to the predetermined detection signal, verifying that the docking of the docking terminal group in the robot with the conductive terminal group in the docking station has succeeded.

Preferably, the predetermined detection signal and the predetermined feedback signal are regular variable signals.

Preferably, the predetermined detection signal and the predetermined feedback signal have same period.

Preferably, the predetermined detection signal and the predetermined feedback signal are square wave signals and have same period.

Preferably, at least one of a first signal conversion unit and a second signal conversion unit is set in the robot, the first signal conversion unit is set between the signal transmission module and the first docking terminal, the second signal conversion unit is set between the signal receiving module and the second docking terminal, the first signal conversion unit and the second signal conversion unit can change electrical parameters of signal passing therethrough.

Preferably, the first signal conversion unit and the second signal conversion unit amplify or decrease the signals passing therethrough.

Preferably, the first signal conversion unit and the second signal conversion unit are set in the robot, the first signal conversion unit amplifies the signal passing therethrough, the second signal conversion unit decreases the signal passing therethrough.

Preferably, the second signal conversion unit isolates electrical signal transferred between the second docking terminal and the signal receiving module.

Preferably, after verifying that the docking of the docking terminal group in the robot and the conductive terminal in the docking station has succeeded, the robot stops moving.

Preferably, after the robot stops moving, the signal transmission module sends out a predetermined detection signal again, if the signal receiving module receives a predetermined feedback signal corresponding to the predetermined detection signal, the robot control unit controls the robot keeping the status of stopped movement, if the signal receiving module does not receive a predetermined feedback signal corresponding to the predetermined detection signal, the robot control unit controls the robot beginning to move.

Preferably, an across circuit is set between the first conductive terminal and the second conductive terminal, the across circuit transfers signal between the first conductive terminal and the second conductive terminal.

Preferably, a docking station control unit is set in the docking station, the docking station control unit controls working state of the docking station and detects signal transferred between the first conductive terminal and the second conductive terminal, when docking station control unit detects a predetermined startup signal corresponding to the predetermined detection signal, the docking station control unit controls docking station to begin charging process.

Preferably, the predetermined startup signal is a regular variable square wave signal.

Preferably, the predetermined startup signal is a square wave signal having a predetermined period.

Preferably, a signal detection unit is set between the docking station control unit and the first and second conductive terminals, the docking station control unit detects signal transferred between the first conductive terminal and the second conductive terminal through the signal detection unit.

Preferably, the signal detection unit changes electrical parameters of signal passing therethrough.

Preferably, the signal detection unit decreases the signal passing therethrough.

Preferably, the signal detection unit isolates electrical signal transferred between the conductive terminal group and the docking station control unit.

Preferably, an output power control unit is set in the docking station, the output power control permits or prevents providing charging power to the first conductive terminal and the second conductive terminal, before beginning charging process, the docking station control unit controls the output power control unit preventing providing charging power to the first conductive terminal and the second conductive terminal, the output power of the first conductive terminal and the second conductive terminal is zero, after beginning charging process, the docking station control unit controls the output power control unit permitting providing charging power to the first conductive terminal and the second conductive terminal, the first conductive terminal and the second conductive terminal output the charging power.

Preferably, a storage power detection unit is set in the robot, the storage power detection unit detects power level of the power storage unit and transfers the detected signal to the robot control unit, when the power level is less than a predetermined level, the robot control unit controls the robot returning to the docking station.

Preferably, the robot also includes a forced charging assembly which operatively sends a charging order signal to the robot control unit, when the forced charging assembly sends a charging order signal, the robot control unit controls the robot returning to the docking station.

Preferably, the robot also includes a rain detector which sends out a detected signal to the robot control unit, when the rain detector detects rain, the robot control unit controls the robot returning to the docking station.

Preferably, the robot is a lawn mower and includes a cutting assembly operable to cut grass.

The present invention also provides a robot which can selectively dock to a docking station and receive charging power from the docking station. The robot comprises a docking terminal group. The docking terminal group comprises at least a first docking terminal and a second docking terminal. The docking station comprises a conductive terminal group which comprises at least a first conductive terminal and a second conductive terminal. The conductive terminal group is configured to be electrically connected to the docking terminal group respectively. The robot also comprises a power storage unit configured to supply power for the robot; a robot control unit configured to control working state of the robot. The robot control unit comprises a signal transmission module configured to be electrically connected to the first docking terminal and send out a predetermined detection signal; a signal receiving module configured to be electrically connected to the second docking terminal. When the signal receiving module receives a predetermined feedback signal corresponding to the predetermined detection signal, the robot control unit verifies that the docking of the docking terminal group of the robot with the conductive terminal group of the docking station has succeeded.

Preferably, the predetermined detection signal and the predetermined feedback signal are regular variable signals.

Preferably, the predetermined detection signal and the predetermined feedback signal have same period.

Preferably, the predetermined detection signal and the predetermined feedback signal are square wave signals and have same period.

Preferably, the robot includes at least one of a first signal conversion unit and a second signal conversion unit, the first signal conversion unit is set between the signal transmission module and the first docking terminal, the second signal conversion unit is set between the signal receiving module and the second docking terminal, the first signal conversion unit and the second signal conversion unit can change electrical parameters of signal passing therethrough.

Preferably, the first signal conversion unit and the second signal conversion unit amplify or decrease the signals passing therethrough.

Preferably, the robot includes the first signal conversion unit and the second signal conversion unit, the first signal conversion unit amplifies the signal passing therethrough, the second signal conversion unit decreases the signal passing therethrough.

Preferably, the second signal conversion unit isolates electrical signal transferred between the second docking terminal and the signal receiving module.

Preferably, after the robot control unit verifying that the docking of the robot and the docking station has succeeded, the robot control unit controls robot stopping moving.

Preferably, after the robot stops moving, the signal transmission module sends out a predetermined detection signal, if the signal receiving module receives a predetermined feedback signal corresponding to the predetermined detection signal, the robot control unit controls the robot keeping the status of stopped movement, if the signal receiving module does not receive a predetermined feedback signal corresponding to the predetermined detection signal, the robot control unit controls the robot beginning to move.

Preferably, the robot also includes a storage power detection unit which detects power level of the power storage unit and transfers the detected signal to the robot control unit. When the power level is less than a predetermined level, the robot control unit controls the robot returning to the docking station.

Preferably, the robot also includes a forced charging assembly which operatively sends a charging order signal to the robot control unit. When the forced charging assembly sends a charging order signal, the robot control unit controls the robot returning to the docking station.

Preferably, the robot also includes a rain detector which sends a detected signal to the robot control unit. When the rain detector detects rain, the robot control unit controls the robot returning to the docking station.

Preferably, the robot is a lawn mower and includes a cutting assembly operable to cut grass.

The present invention also provides another robot which can selectively dock to a docking station and receive charging power from the docking station. The robot comprises a docking terminal group. The docking terminal group comprises at least a first docking terminal and a second docking terminal. The docking station comprises a conductive terminal group. The conductive terminal group comprises at least a first conductive terminal and a second conductive terminal, the conductive terminal group configured to be electrically connected to the docking terminal group respectively. The robot also comprises a power storage unit configured to supply power for the robot; a robot control unit configured to control working state of the robot. The robot also comprises a signal transmission module configured to be electrically connected to the first docking terminal and send out a predetermined detection signal; a signal receiving module configured to be electrically connected to the second docking terminal. When the signal receiving module receives a predetermined feedback signal corresponding to the predetermined detection signal, verifies that the docking of the docking terminal group of the robot with the conductive terminal group of the docking station has succeeded.

Preferably, the predetermined detection signal and the predetermined feedback signal are regular variable signals.

Preferably, the predetermined detection signal and the predetermined feedback signal have same period.

Preferably, the predetermined detection signal and the predetermined feedback signal are square wave signals and have same period.

The present invention also provides another robot which can selectively dock to a docking station and receive charging power from the docking station. The robot comprises a docking terminal group which comprises at least a first docking terminal and a second docking terminal. The docking station comprises a conductive terminal group which comprises at least a first conductive terminal and a second conductive terminal. The conductive terminal group is configured to be electrically connected to the docking terminal group respectively. The robot sends out a predetermined detection signal through the first docking terminal, and receives signal from the second docking terminal. When the robot receives a predetermined feedback signal corresponding to the predetermined detection signal, verifies that the docking of the docking terminal group in the robot with the conductive terminal group in the docking station has succeeded.

Preferably, the predetermined detection signal and the predetermined feedback signal are regular variable signals.

Preferably, the predetermined detection signal and the predetermined feedback signal have same period.

Preferably, the predetermined detection signal and the predetermined feedback signal are square wave signals and have same period.

The present invention also provides a docking station which can selectively dock to a robot and provide charging power to the robot. The docking station comprises a conductive terminal group which comprises at least a first conductive terminal and a second conductive terminal. The robot comprises a docking terminal group, a signal receiving module, and a signal transmission module. The docking terminal group comprises at least a first docking terminal and a second docking terminal. The conductive terminal group is configured to be electrically connected to the docking terminal group respectively. The signal transmission module sends out a predetermined detection signal through the first docking terminal. The signal receiving module receives signal from the second docking terminal. When the docking of the robot and the docking station has succeeded, the first conductive terminal and the second conductive terminal can transfer signal between the first docking terminal and the second docking terminal.

Preferably, the docking station also includes an across circuit set between the first conductive terminal and the second conductive terminal, the across circuit transfers signal between the first conductive terminal and the second conductive terminal.

Preferably, the docking station also includes a docking station control unit, the docking station control unit controls working state of the docking station and detects signal transferred between the first conductive terminal and the second conductive terminal, when docking station control unit detects a predetermined startup signal corresponding to the predetermined detection signal, docking station control unit controls docking station to begin charging process.

Preferably, the predetermined startup signal is a regular variable square wave signal.

Preferably, the predetermined startup signal is a square wave having a predetermined period.

Preferably, the docking station also includes a signal detection unit which is set between the docking station control unit and the first and second conductive terminals, the docking station control unit detects signal transferred between the first conductive terminal and the second conductive terminal through the signal detection unit.

Preferably, the signal detection unit changes electrical parameters of signal passing therethrough.

Preferably, the signal detection unit decreases the signal passing therethrough.

Preferably, the signal detection unit isolates electrical signal transferred between the conductive terminal group and docking station control unit.

Preferably, the docking station also includes an output power control unit which permits or prevents providing charging power to the first conductive terminal and the second conductive terminal, before beginning charging process, the docking station control unit controls the output power control unit preventing providing charging power to the first conductive terminal and the second conductive terminal, the output power of the first conductive terminal and the second conductive terminal is zero, after beginning charging process, the docking station control unit controls the output power control unit permitting providing charging power to the first conductive terminal and the second conductive terminal, the first conductive terminal and the second conductive terminal output the charging power.

The present invention also provides another docking station which can selectively dock to a robot and provide charging power to the robot. The docking station comprises a conductive terminal group which comprises at least a first conductive terminal and a second conductive terminal. The first conductive terminal is electrically communicated with the second conductive terminal.

Preferably, the docking station also includes an across circuit set between the first conductive terminal and the second conductive terminal, the across circuit transfers signal between the first conductive terminal and the second conductive terminal.

Preferably, before the docking of the robot and the docking station having succeeded, the output of the first conductive terminal and the second conductive terminal is zero.

Preferably, the docking station also includes a docking station control unit, the docking station control unit controls working state of the docking station and detects signal transferred between the first conductive terminal and the second conductive terminal, when docking station control unit detects a predetermined startup signal corresponding to the predetermined detection signal, docking station control unit controls docking station to begin charging process.

Preferably, the predetermined startup signal is a regular variable square wave signal.

Preferably, the predetermined startup signal is a square wave having a predetermined period.

The robot of the present invention can reliably dock to the docking station without human intervention, which brings extreme convenience to production and life.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The following are the detailed description and technical contents of the invention with the reference of the attached drawings. The drawings are intended for reference only and shall not be regarded as the limit of the invention.

The term "transfer" also refers to "transmit", "send", and some other similar words. The term "convert" also refers to "transit", "change", and some other similar words. The term "decrease" also refers to "reduce", "depress", and some other similar words. The term "initiate" also refers to "begin", "start", and some other similar words.

Figure 1:
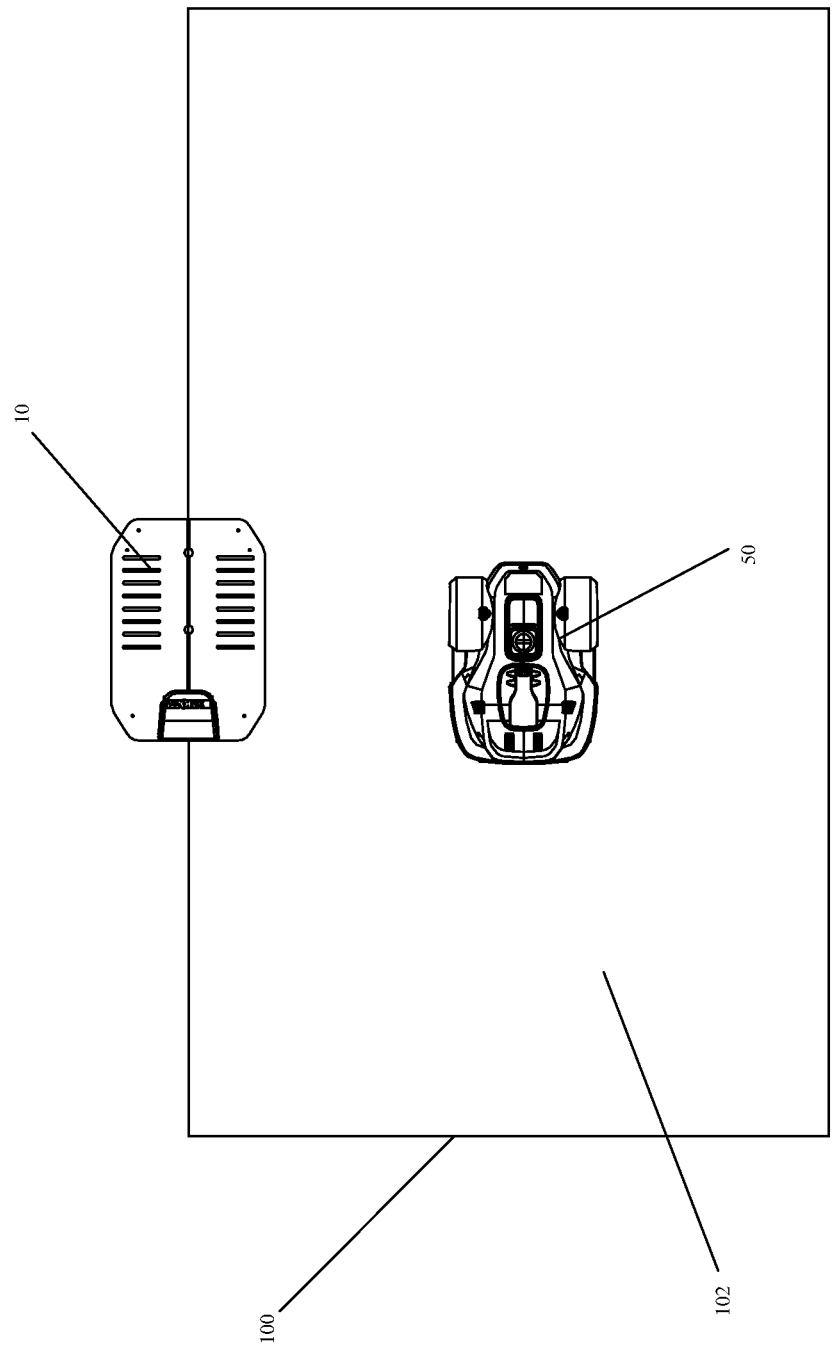
FIG. 1 is a schematic view of a robot and docking station in a preferable embodiment.

As shown in FIG. 1, a docking system consists of a docking station 10 and a robot 50. The docking system also comprises a boundary wire 100 for dividing a working area 102. The docking station 10 is located on the boundary wire 100. The robot 50 works automatically in the working area 102 formed by the boundary wire 100 to work according to the predetermined requirements. When requiring recharging, completing work, exceeding the working time, or detecting rain, the robot 50 returns to the docking station 10 along the boundary wire 100 to try to dock to the docking station 10. Once the docking of the robot 50 and the docking station 10 has succeeded, the robot 50 stops moving, and the docking station 10 begins charging process to charge the robot 50. The docking system consisting of the docking station 10 and the robot 50 may not include the boundary wire 100, and then the robot 50 can be guided to return to the docking station 10 via other wireless signals.

Figure 2:
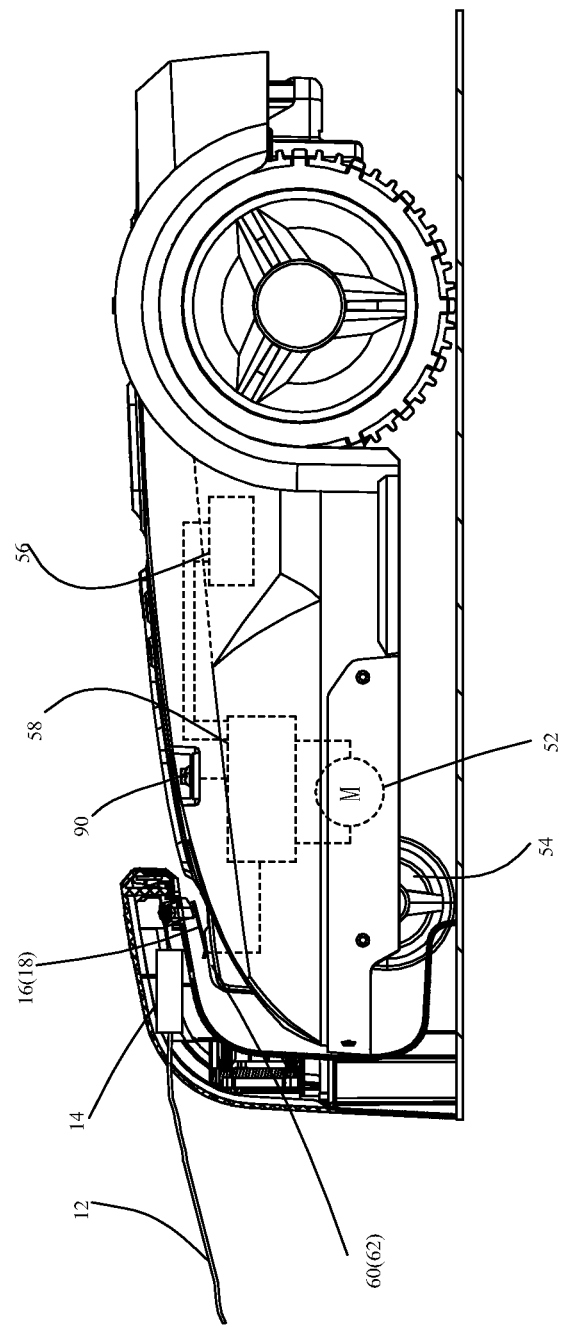
FIG. 2 is a schematic view of the docking of a robot and a docking station as shown in FIG. 1.

As shown in FIG. 2, the docking station 10 comprises a power wire 12, a second printed circuit board 14 electrically connected with the power wire 12, and a conductive terminal group connected with the output end of the second printed circuit board 14; the conductive terminal group comprises at least a first conductive terminal 16 and a second conductive terminal 18 (due to the angle, the first conductive terminal 16 and the second conductive terminal 18 in the figure are overlapped). The robot 50 comprises a docking terminal group electrically connected to the conductive terminal group, a first printed circuit board 58 electrically connected with the docking terminal group, a moving mechanism controlled by the first printed circuit board 58, and a power storage unit 56 supplying power to the robot 50, the docking terminal group at least comprises a first docking terminal 60 and a second docking terminal 62 (due to the angle, the first conductive terminal 60 and the second conductive terminal 62 in the figure are overlapped). The moving mechanism further comprises a motor 52 and wheels 54 driven by the motor 52. When the robot 50 requires recharging, the moving mechanism drives the robot 50 to return to the docking station 10 to try to dock with the docking station 10.

Figure 3:
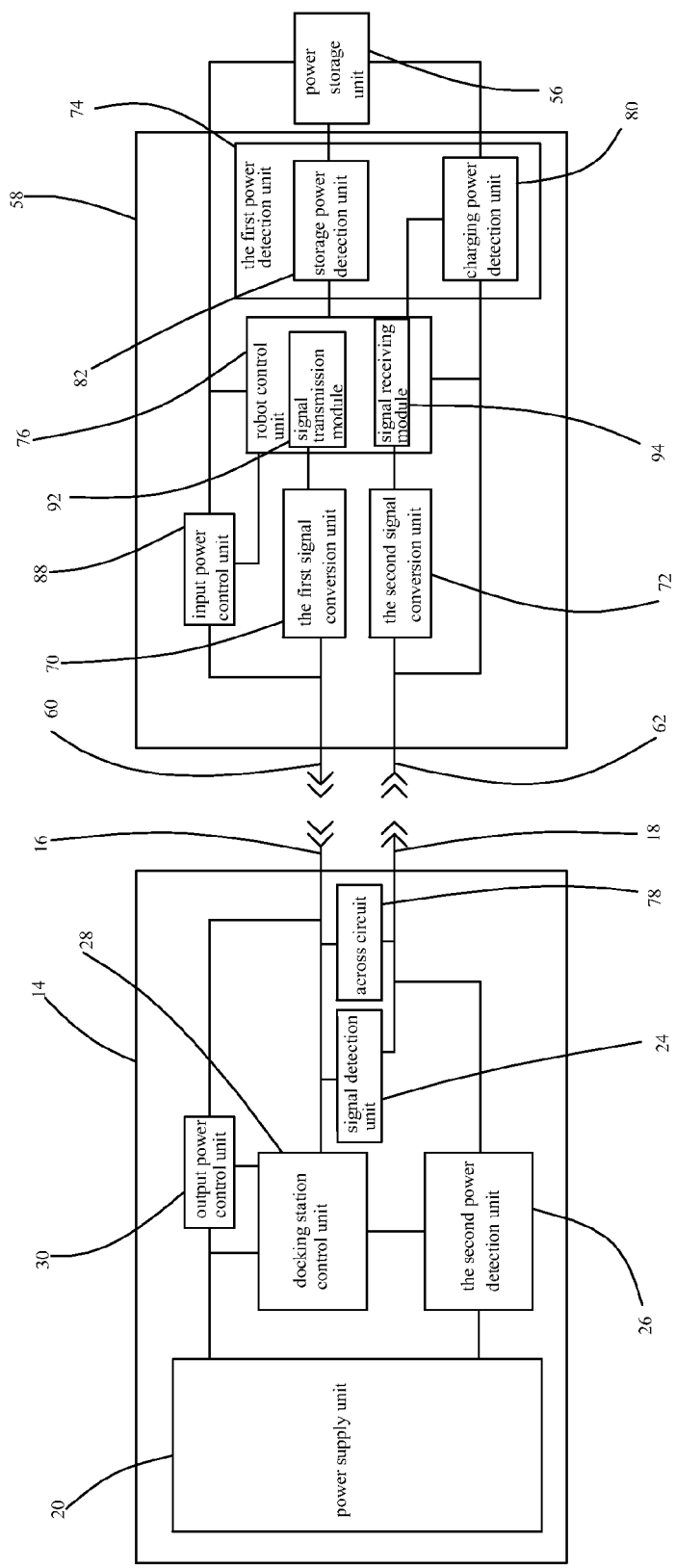
FIG. 3 is a circuit module diagram of a robot and a docking station as shown in FIG. 1.

As shown in FIG. 3, the second printed circuit board 14 further comprises a power supply unit 20, a signal detection unit 24, a second power detection unit 26, an output power control unit 30 and a docking station control unit 28. The power supply unit 20 is configured for converting an external DC or AC into a power supply suitable for supplying charging power to the power storage unit 56 and can selectively apply power to the first conductive terminal 16 and the second conductive terminal 18; the signal detection unit 24 is electrically connected with the first conductive terminal 16 for detecting signals transferred between the first conductive terminal 16 and the second conductive terminal 18 and transferring the detected signals to the docking station control unit 28; the signal detection unit 24 can change the electric parameters of the signals passing therethrough, such as amplifying and decreasing the signal amplitude or changing the signal frequency and the signal type, such as changing the received sine wave signals into square wave signals; the second power detection unit 26 is configured for detecting the charging power applied by the power supply unit 20 to the first conductive terminal 16 and the second conductive terminal 18 and transferring the detected signals to the docking station control unit 28; the output power control unit 30 is configured for controlling the power transferred from the power supply unit 20 to the first conductive terminal 16 and the second conductive terminal 18; when the output power control unit 30 allows the power supply unit 20 to supply power to the first conductive terminal 16 and the second conductive terminal 18, the first conductive terminal 16 and the second conductive terminal 18 output charging power; when the output power control unit 30 prevents the power supply unit 20 supplying power to the first conductive terminal 16 and the second conductive terminal 18, the first conductive terminal 16 and the second conductive terminal 18 have no output, which means that the output of first conductive terminal 16 and the second conductive terminal 18 is zero; and the docking station control unit 28 controls the working state of the output power control unit 30 according to the signals detected by the signal detection unit 24 and the second power detection unit 26. The second printed circuit board 14 also comprises an across circuit 78 placed between the first conductive terminal 16 and a second conductive terminal 18; the across circuit 78 is configured for electrically communicating with the first conductive terminal 16 and the second conductive terminal 18 to transmit signals and/or power between them.

The first printed circuit board 58 further comprises a first signal conversion unit 70, a second signal conversion unit 72, a first power detection unit 74, an input power control unit 88 and a robot control unit 76, wherein the robot control unit 76 further comprises a signal transmission module 92 and a signal receiving module 94; the first signal conversion unit 70 is set between the first docking terminal 60 and the signal transmission module 92; and the second conversion unit 72 is set between the signal receiving module 94 and the second docking terminal 62. The signal transmission module 92 is configured for generating and transferring signals, the transferred signal passes through the first signal conversion unit 70; the first signal conversion unit 70 is configured for changing the electric parameters of the flowing signal, such as amplifying or decreasing the signal amplitude and changing the signal frequency and signal type, and transferring the transmitted signals to the first docking terminal 60; the second signal conversion unit 72 is configured for transmitting the signals received by the second docking terminal 62 from the outside and transferring the transmitted signals to the signal receiving module 94, and can change the electric parameters of the flowing signal; the first power detection unit 74 is configured for detecting the charging power transferred from the first docking terminal 60 and the second docking terminal 62 to the power storage unit 56 and transferring the detected signals to the robot control unit 76; the input power control unit 88 controls the power transferring from the first docking terminal 60 and the second docking terminal 62 to the power storage unit 56; the robot control unit 76 sends out a corresponding control signals according to the detected signals provided by the second signal conversion unit 72 and the first power detection unit 74, and controls the working state of the first power detection unit 74 by the corresponding control signals. The first power detection unit 74 further comprises a charging power detection unit 80 and a storage power detection unit 82; the charging power detection unit 80 is configured for detecting the power applied by the first docking terminal 60 and the second docking terminal 62 onto the power storage unit 56; and the storage power detection unit 82 is configured for detecting the current power of the power storage unit 56.

When the robot 50 returns, the signal transmission module 92 sends out a predetermined detection signal to the first docking terminal 60 via the first signal conversion unit 70; at the same time, the signal receiving module 94 detects the signals transferred from the second docking terminal 62 via the second signal conversion unit 72 and determines if the received signal is a predetermined feedback signal corresponding to the predetermined detection signal. When the conductive terminal group is respectively connected with the docking terminal group, the predetermined detection signal sent from the signal transmission module 92 is transferred to the first docking terminal 60 via the first signal conversion unit 70; the first docking terminal 60 transfers the received signals to the first conductive terminal 16; the first conductive terminal 16 transfers the received signal to the second conductive terminal 18 via the across circuit 78; the second conductive terminal 18 transfers the received signal to the second docking terminal 62; the second docking terminal 62 transfers the received signal to the signal receiving module 94 via the second signal conversion unit 72; by transferring in the communication loop including the first signal conversion unit 70, the first docking terminal 60, the first conducive terminal 16, the cross circuit 78, the second conductive terminal 18, the second docking terminal 62 and the second signal conversion unit 72, the predetermined detection signal sent by the signal transmission module 92 is converted into the corresponding feedback signal and transferred to the signal receiving module 94. Therefore, if the signal receiving module 94 receives the predetermined feedback signal corresponding to the predetermined detection signal, the robot control unit 76 verifies that the docking between the docking terminal group of the robot 50 and the conductive terminal group of the docking station 10 has succeeded, and then the robot control unit 76 controls the robot 50 to stop moving; otherwise, when the conductive terminal group is not electrically connected with the docking terminal group, it fails to form the communication loop between the signal transmission module 92 and the signal receiving module 94, so the predetermined detection signal sent by the signal transmission module 92 fails to return to the signal receiving module 94 via the communication loop and the signal receiving module 94 therefore fails to receive the predetermined feedback signal corresponding to the predetermined detection signal, and at this moment the robot control unit 76 verify that the docking between the docking terminal of the robot 50 and the conductive terminal group of the docking station 10 has not succeeded; and then the signal transmission module 92 will continue to send out the predetermined detection signals.

As mentioned above, when the conductive terminal group and the docking terminal group are in electric connection, the signal transferred by the first docking terminal 60 passes through the first conductive terminal 16, the across circuit 78 and the second conductive terminal 18. When the signals pass through the across circuit 78, the signal detection unit 24 detects the signal, converts the signal into a predetermined startup signal corresponding to the predetermined detection signal and feeds it to the docking station control unit 28; after detecting the predetermined startup signal, the docking station control unit 28 verifies if the docking between the docking terminal group of the robot 50 and the conductive terminal group of the docking station 10 has succeeded, and if so, begins charging process and transfers a control signal to control the output power control unit 30 to permit the power supply unit 20 to provide power to the first conductive terminal 16 and the second conductive terminal 18; and the docking station 10 starts to charge the robot 50. After the charging process beginning, the second power detection unit 26 detects the charging power transferred from the power supply unit 20 to the first conductive terminal 16 and the second conductive terminal 18 in real time and transfers the detected signal to the docking station control unit 28; once detecting that the charging power exceeds a predetermined level, the docking station control unit 28 controls the output power control unit 30 to prevents providing power from the power supply unit 20 to the first conductive terminal 16 and the second conductive terminal 18, and thus, the charging process is ended. When the second power detection unit 26 detects the power transferred from the power supply unit 20 to the first conductive terminal 16 and the second conductive terminal 18, the first power detection unit 74 of the robot 50 detects the power applied by the first docking terminal 60 and the second docking terminal 62 to the power storage unit 56, and transfers the detected signal to the robot control unit 76. Once detecting that the charging power exceeds a predetermined level, the robot control unit 76 controls the input power control unit 88 to stop power transferred from the first docking terminal 60 and the second docking terminal 62 to the power storage unit 56. Except for determining if there is need to terminate the power transferring through a power detection unit to detect the power, both the docking station control unit 28 and the robot control unit 76 can judge if the charging time exceeds a predetermined value by setting a timer so as to control the stoppage of the power transferring. Besides, the robot control unit 76 can also judge if the power transferring requires being stopped by detecting the inner signal of the power storage unit 56, such as detecting the inner temperature of the power storage unit 56. For example, when the internal temperature of the power storage unit 56 exceeds the predetermined temperature level, the robot control unit 76 stops the power transmission from the first docking terminal 60 and the second docking terminal 62 to the power storage unit 56 so as to stop charging the power storage unit 56. After being fully recharged, the robot 50 can return to the working area 102 to work continuously.

In the process of verifying the docking between the docking terminal group of the robot 50 and the conductive terminal group of the docking station 10, the robot 50 and the docking station 10 both verify that the docking has succeeded by verifying the docking between the docking terminal group of the robot 50 and the conductive terminal group of the docking station 10 only once, and then starts charging process. In actual situations, there is time difference between the detecting the predetermined feedback signal and the stopping of the robot 50, so after the robot 50 stops moving, the conductive terminal group and the docking terminal group may be separated. To avoid the mentioned problem, after the robot control unit 76 verifies that docking between the docking terminal group of the robot 50 and the conductive terminal group of the docking station 10 has succeeded the first time and controls the robot 50 to stop moving, the signal transmission module 92 re-sends out the predetermined detection signal, and if the signal receiving module 94 receives the predetermined feedback signal corresponding to the predetermined detection signal again, the robot control unit 76 verifies that docking between the docking terminal group of the robot 50 and the conductive terminal group of the docking station 10 has succeeded again, and controls the moving mechanism to maintain the stop state; otherwise, if the signal receiving module 94 does not receive the predetermined feedback signal corresponding to the predetermined detection signal, the robot control unit 76 does not verify that the docking between the docking terminal group of the robot 50 and the conductive terminal group of the docking station 10 has succeeded, and controls the robot 50 to start moving. After the robot 50 stops moving, the re-sent out predetermined detection signal may be identical with or different from that sent out before the robot 50 stops moving. The robot 50 twice verifies that the docking between the docking terminal group of the robot 50 and the conductive terminal group of the docking station 10 has succeeded; correspondingly, the docking station 10 starts charging process after twice verifying that the docking has succeeded, wherein the first verification is done before the robot 50 stops moving, and the second verification is done after the robot 50 stops moving. According to the setting where the robot 50 considers that the docking between the docking terminal group of the robot 50 and the conductive terminal group of the docking station 10 has succeeded by twice verifying that the docking has succeeded, the docking station 10 is also can be set to start charging process by once verifying that the docking between the docking terminal group of the robot 50 and the conductive terminal group of the docking station 10 has succeeded, in which the condition for verifying that the docking has succeeded is that the docking station control unit 28 receives the predetermined startup signal corresponding to the predetermined detection signal sent out by the signal transmission module 92 the second time. Compared with the mode of starting charging process after two verifications, the mode of starting charging process after once verification is simpler, but the anti-interference performance of the former one is better than the later one.

The above mentioned verification process includes two verification steps, wherein each step may include many sub-steps, and in each sub-step, the signal transmission module 92 can send out a different predetermined detection signal; correspondingly, if the signal receiving module 94 receives the predetermined feedback signals corresponding to the different detection signals, the docking between the docking terminal group of the robot 50 and the conductive terminal group of the docking station 10 can be verified as successful, and if the docking station control unit 28 receives the predetermined startup signals corresponding to the different predetermined detection signals, the docking between the docking terminal group of the robot 50 and the conductive terminal group of the docking station 10 can be verified as successful. In view of simplifying the process and keeping high reliability, the following optimal embodiment adopts a scheme where: each step for verifying that the docking between the docking terminal group of the robot 50 and the conductive terminal group of the docking station 10 has succeeded only includes one sub-step; in the verification process includes two verification steps, the signal transmission module 92 can send out a different predetermined detection signal; correspondingly, if the signal receiving module 94 receives the predetermined feedback signals corresponding to the different predetermined detection signals, the docking between the docking terminal group of the robot 50 and the conductive terminal group of the docking station 10 can be verified as successful, it means if the docking station control unit 28 receives the predetermined startup signals corresponding to the other predetermined detection signals, the docking between the docking terminal group of the robot 50 and the conductive terminal group of the docking station 10 can be verified as successful.

In the above mentioned docking and charging processes, the first conductive terminal 16, the second conductive terminal 18, the first docking terminal 60 and the second docking terminal 62 are configured for signal transferring during docking process and power transferring during charging process. The variation of the first scheme is that: the first conductive terminal 16, the second conductive terminal 18, the first docking terminal 60 and the second docking terminal 62 are only used for signal transferring only, and other terminals are set to transfer the power. After being sent out by the signal transmission module 92, the predetermined detection signal is transferred to the first docking terminal 60 by the first signal conversion unit 70; the signal received by the second docking terminal 62 is transferred to the signal receiving module 94 via the second signal conversion unit 72; the signal sent out by the signal transmission module 92 and the signal received by the signal receiving module 94 both are converted by the signal conversion unit to enable the subsequent circuit to transfer, receive, and identify the signals; therefore, under the basic conditions where the subsequent circuit can transfer, receive, and identify the signals, the signal from the signal transmission module 92 may pass through the first signal conversion unit 70 to be transferred, or be directly transferred without passing through the first signal conversion unit 70; and the signal transferred from the second docking terminal 62 to the signal receiving module 94 may pass through the second signal conversion unit 72 to be transferred, or be directly transferred without passing through the second conversion unit 72.

To overcome the defects of human intervention, the robot 50 is set with many ways to initial returning process, e.g.: expiration of the working time, completion of the work, insufficient power, exposure to rain, manual immediately charging, etc., all can be used as the conditions of the robot 50 for returning to the docking station 10; and when detecting any one of the above mentioned conditions, the robot control unit 76 controls the robot 50 to return to the docking station 10. The detection of the expiration of the working time and completion of the work can be implemented by setting a timer in the robot control unit 76. When the predetermined time expires, the robot 50 is controlled to return to the docking station 10, in which the detailed implementation is known to those skilled persons in this field and therefore is omitted here. The detection of insufficient power is implemented by the storage power detection unit 82 which detects the current residual power of the power storage unit 56 constantly and feeds back the detected result to the robot control unit 76. When the power of the power storage unit 56 is less than the predetermined threshold value, the robot control unit 76 controls the robot 50 to return to the docking station 10 so as to recharge the power storage unit 56; the predetermined threshold value is determined according to the chemical features of the power storage unit 56, and the working state of the robot 50, etc., to ensure that the power storage unit 56 can be fully used after being recharged and to avoid a situation where the robot 50 cannot return to the docking station 10 because of power exhaustion of the power storage unit 56. The detection of exposure to rain is implemented by setting a rain detector on the housing surface of the robot 50; the rain detector is electrically connected with the robot control unit 76; in case of exposure to rain, the rain detector generates and transfers a corresponding signal to the robot control unit 76, then the robot control unit 76 controls the robot 50 to return to be recharged, and this means it can effectively avoid damage to the robot 50 because of rain. To enable the user can force the robot 50 return to docking station 10 to be recharged immediately, a forced charging assembly is set on the housing surface of the robot 50, the forced charging assembly is electrically connected with the robot control unit 76; when detecting the manual immediately charging request from a user, the forced charging assembly can convert the manual immediately charging request into an electric signal and transmit the signal to the robot control unit 76, then the robot control unit 76 controls the robot 50 to return to the docking station 10. This means it is mainly used for quickly responding the manual immediately charging requests of the user; even if the power storage unit 56 has a great amount of power, the user can send the charging command to the robot control unit 76 via the forced charging assembly; after receiving the charging command, the robot control unit 76 controls the robot 50 to return to the docking station 10 to recharge the power storage unit 56.

Figure 4:
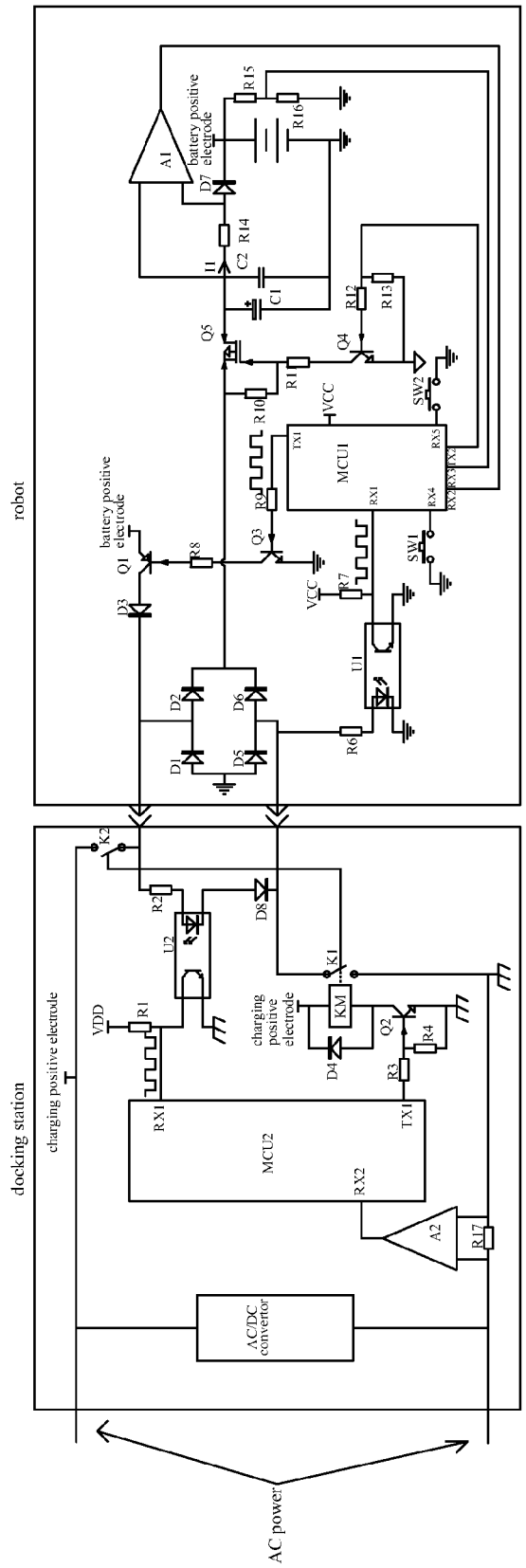
FIG. 4 is a circuit frame diagram of a robot and a docking station as shown in FIG. 1.

The components and working modes of each functional unit of the second printed circuit board 14 and the first printed circuit board 58 are described in detail with reference to the FIG. 4. The functional units of the first printed circuit board 58 go first.

The robot control unit 76 comprises a signal transmission module 92 and a signal receiving module 94 and therefore has the functions of generating, transmitting and receiving signals. The robot control unit 76 can make judgments according to the received signals and transmit corresponding control signals and therefore shall have the functions of identification, judgment, generation of control signals according to the signal judgment results, etc. Based on the above mentioned function demands, the robot control unit 76 can be set to many forms, such as an analogue circuit, a digital circuit, and the combination of a simulating circuit and digital circuit. In this embodiment, the robot control unit 76 implements the above mentioned functions in the format of digital circuit, namely a microcontroller which is a well-known integrated circuit unit capable of completing related actions to implement corresponding functions by compiling the predetermined program. The microcontroller has the advantages of: the microcontroller is integrated with the functions of detection, identification, judgment, generation, and transmission of signals, timing, and calculation, etc.; and the components are simplified. The microcontroller has many models and can be selected according to the functional demands. In this embodiment, the selected microcontroller has the functions of detection, identification, judgment, generation, and transmission of signals, timing, calculation, etc. Provided that the robot control unit 76 uses the microcontroller to implement all the functions, the functions of the signal transmission module 92 and the signal receiving module 94 are built into the microcontroller. To express clearly, the microcontroller of the robot control unit 76 is a microcontroller MCU1. The microcontroller MCU1 further comprises first signal receiving ports RX1, RX2, RX3, RX4, and RX5, and first signal transmission ports TX1 and TX2, wherein the first signal receiving port RX1 is electrically connected with the second signal conversion unit 72 for receiving the signal transferred from the second signal conversion unit 72; the first signal receiving port RX2 is electrically connected with the charging power detection unit 80 for receiving the signal of the power transmission from the first docking terminal 60 and the second docking terminal 62 to the power storage unit 56 from the charging power detection unit 80; the first signal receiving port RX3 is electrically connected with the storage power detection unit 82 for receiving the current power of the power storage unit 56 transferred by the storage power detection unit 82; the first signal receiving port RX4 is electrically connected with the forced charging assembly for receiving the signal from the forced charging assembly; the first signal receiving port RX5 is electrically connected with the rain detector for receiving the signal from the rain detector; the first signal transmission port TX1 is electrically connected with the first signal conversion unit 70 for transmitting the predetermined detection signal generated by the microcontroller MCU1; and the first signal transmission port TX2 is electrically connected with the input power control unit 88 for transmitting the control signal to the input power control unit 88 to control the power transmission from the first docking terminal 60 and the second docking terminal 62 to the power storage unit 56. The robot control unit 76 controls the signal output of the first signal transmission ports TX1 and TX2 according to the signals received by the first signal receiving ports RX1, RX2, RX3, RX4, and RX5.

Figure 5:
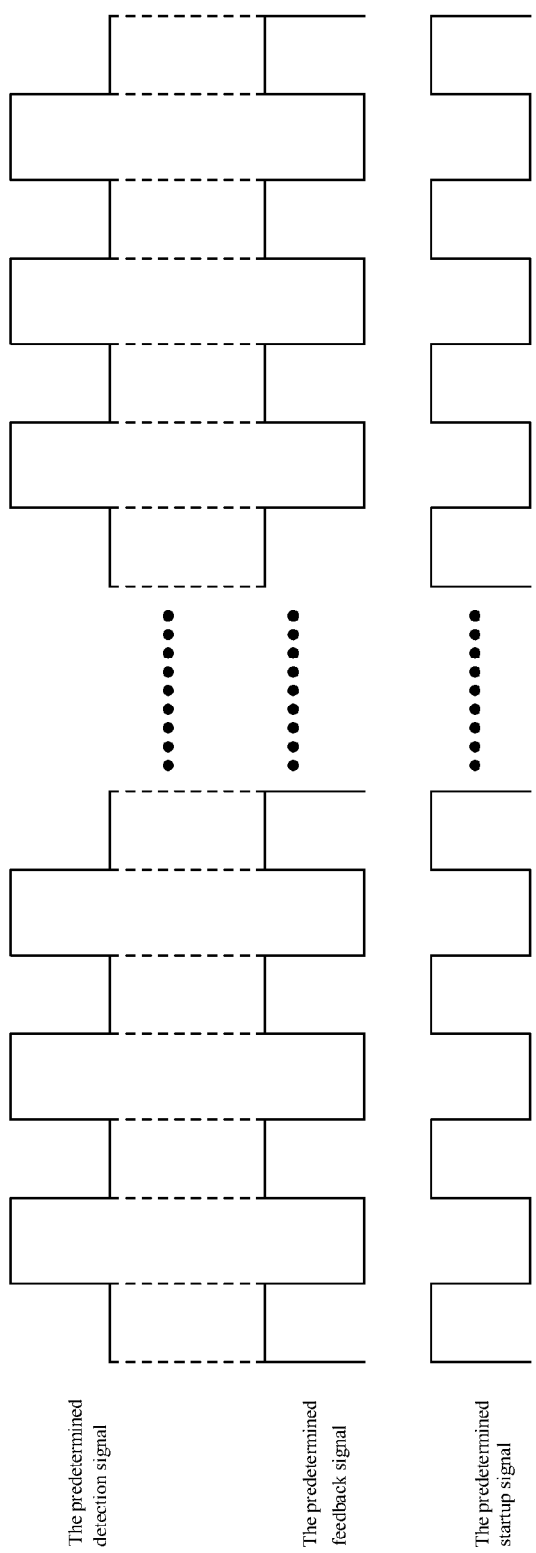
FIG. 5 illustrates the shape of a predetermined detection signal generated by a robot and the shape of a predetermined feedback signal received by a robot as shown in FIG. 1.

When the robot 50 returns to dock to the docking station 10, the microcontroller MCU1 continuously sends the predetermined detection signal in various formats, such as sine wave, square wave, and pulse signal. Compared with the pulse signal, the sine wave signal has high anti-interference performance; compared with the sine wave signal, the square signal is easier to be generated and identified by the microcontroller; preferably, this embodiment adopts the square wave signal. Various forms of square wave signals are available, such as a square wave signal with a constant pulse width and a constant period, a square wave signal with a constant period and an increasing pulse width, a square wave signal with a constant pulse width and an increasing period, a square wave signal with an increasing pulse width and an increasing period, a square wave signal with a pulse with and a period one increasing and the other reducing, etc. In this embodiment, the square wave signal having an amplitude, a pulse width and a period unchanged, as shown in FIG. 5, is adopted as the predetermined detection signal. The amplitude of the predetermined detection signal is the same as the working voltage amplitude Vcc of the microcontroller MCU1. Generally, the working voltage amplitude of the microcontroller MCU1 may be 3-5V. In this embodiment, the working voltage amplitude of the microcontroller MCU1 is 5V, so the amplitude of the predetermined detection signal is 5V. The predetermined detection signal passes through and is correspondingly converted by the first signal conversion unit 70 and then is transferred to the first docking terminal 60, or is directly transferred to the first docking terminal 60 without passing through the first signal conversion unit 70.

The first signal conversion unit 70 performs necessary conversion on the flowing signals. The conversion includes amplification, reduction, and period and type change of the signal, etc. The amplification or reduction of the signal can be easily implemented, but the period or type change of the signal shall be implemented with a special chip, which is complicated. The aim of the first signal conversion unit 70 converting the signal is to facilitate transmission and identification of the signal in the subsequent loop. To fulfill the above mentioned aim, the first signal conversion unit 70 amplifies the signal passing therethrough. There are many ways to amplify the signal. The first signal conversion unit 70 can be set into a combination of resistors and switch transistors, or a combination of resistors and a computing amplifier. In this embodiment, the combination of resistors and switch transistors is adopted as the first signal conversion unit 70, including resistors R8 and R9 and the switch transistors Q1 and Q3, wherein the collector electrode of the switch transistor Q1 is electrically connected with the positive electrode of the power storage unit 56; the switch transistor Q3 is electrically connected with the negative electrode of the power storage unit 56; one end of the resistor R9 is electrically connected with the first signal transmission port TX1 and the other end is connected with the base electrode of the switch transistor Q3. When the predetermined detection signal has a high level, it controls the switch transistor Q3 to be switched on via the resistor R9 and puts the base electrode of the switch transistor Q1 at a low level state via the resistor R8, and then the switch transistor Q1 is switched on; furthermore, to enable the positive electrode of the power storage unit 56 electrically connected with the first docking terminal 60, which means that the signal applied to the first docking terminal 60 has a high level. Otherwise, when the predetermined detection signal has a low level, it controls the switch transistor Q3 to be switch off via the resistor R9 and puts the electrode of the switch transistor Q1 at a high level via the resistor R8; when the switch transistor Q1 is switched off, no power is applied to the first docking terminal 60, so the signal applied to the first docking terminal 60 has a low level. After being converted by the first signal conversion unit 70, the signal applied to the first docking terminal 60 is a square signal of which the period and pulse width are the same as those of the predetermined detection signal, but the amplitude is different, wherein the amplitude is equal to the voltage of the power storage unit 56. The voltage of the power storage unit 56 is higher than the working voltage Vcc of the microcontroller MCU1, so the first signal conversion unit 70 amplifies the amplitude of the predetermined detection signal, which has the advantages of strengthening the predetermined detection signal and avoiding a situation where the signal cannot be detected by the detection unit after being further reduced by the subsequent circuit. The collector electrode of the switch transistor Q1 may also be set to be electrically connected with the working power supply Vcc of the microcontroller MCU1. In this state, the first signal conversion unit 70 will not change the predetermined detection signal. The collector electrode of the switch transistor Q1 may also be set to be electrically connected with a power supply lower than the working voltage Vcc of the microcontroller MCU1. In this state, the first signal conversion unit 70 reduces the predetermined detection signal. In the state that the first signal conversion unit 70 does not amplify the predetermined detection signal, and even reduces the predetermined detection signal, the subsequent circuit may also detect the predetermined detection signal. But it should be noted that the subsequent transmission and detection units shall have a small impedance to avoid excessive consumption of the predetermined detection signal to excessively reduce the signal.

Like the first signal conversion unit 70, the second signal conversion unit 72 also performs necessary conversion to facilitate signal transmission and identification in the subsequent circuit. The second signal conversion unit 72 is arranged between the second docking terminal 62 and the first signal receiving ports of the microcontroller MCU1, and the second signal conversion unit 72 converts the signal to facilitate the microcontroller MCU1 to indentify the signal, while the first signal conversion unit 70 amplifies the signal, so the second signal conversion unit 72 is set to reduce the signal passing therethrough. Based on the above mentioned functional requirements, the second signal conversion unit 72 may be set to be a circuit consisting of resistors and a computing amplifier, resistors and switch transistors, or resistors and an optical coupler, etc. Besides, considering that the second docking terminal 62 exposed on the housing surface of the robot 50 may easily contact electrostatic power, and to avoid damage to the internal components caused by the electrostatic power applied to the second signal conversion unit 72, the second signal conversion unit 72 is the combination of the resistors and the optical coupler so as to form two separate parts, wherein the first part communicates with the second docking terminal 62 and the second part communicates with the first signal receiving port RX1 to implement electrical isolation between the external circuit and the internal circuit and avoid damage to the internal circuit caused by electrostatic power which may be encountered in the second docking terminal 62. Therefore, the structure of the second signal conversion unit 72 can be seen in FIG. 4, comprising a resistor R6 electrically connected with the second docking terminal 62, a resistor R5 with one end electrically connected with the first signal receiving port RX1 and the other end electrically connected with the working power supply Vcc of the microcontroller MCU1, and an optical coupler U1 isolating R5 and R6. The light-emitting part of the optical coupler U1 is connected in series with the resistor R6, while the receiving part of the optical coupler U1 is connected in series with the resistor R5; when the signal passing through the resistor R6 has a high level, the light-emitting part of the optical coupler U1 emits light, while the receiving part of the optical coupler U1 is switched on, and at this moment, the signal received by the first signal receiving port RX1 has a low level; when the signal flowing through the resistor R6 has a low level, the light-emitting part of the optical coupler U1 does not emit light, while the receiving part of the optical coupler U1 is switched off; at this moment the signal received by the first signal receiving port RX1 has a high level, and the amplitude of the high-level signal is the working voltage Vcc of the microcontroller MCU1. The second signal conversion unit 72 inverts the phase of the flowing signal and converts the signal into a signal with an amplitude of Vcc, which means that the second signal conversion unit 72 inverts the phase and reduces the signal passing therethrough; besides, the optical coupler is used to isolate the electrical signal, so the second signal conversion unit 72 inverts the phase, reduces, and isolates the signal. Besides, the resistor R5 may also be not electrically connected with the working power supply Vcc of the microcontroller MCU1, but connected with other constant power supply. For example, when the resistor R5 is electrically connected with a power supply with a constant voltage, such as 3V, 4V and 6V, the amplitude of the signal received by the first signal receiving port RX1 is the corresponding voltage, in which the details are omitted here.

The charging power detection unit 80 is used for detecting the charging power in the charging process where the docking station 10 charges the robot 50 and transfers the detection result to the robot control unit 76. In terms of functions, the charging power detection unit 80 may be set into a functional circuit for detecting the current, voltage or detecting the current and voltage at the same time. When the charging power detection unit 80 detects that the power exceeds a predetermined level, which means that the current is less than a predetermined value or the voltage is bigger than a predetermined value, the microcontroller MCU1 controls the input power control unit 88 to stop power transmission from the first docking terminal 60 and the second docking terminal 62 to the power storage unit 56 according to the signal received by the charging power detection unit 80 so as to stop the charging process of the docking station 10 charging the robot 50. In this embodiment, current detection is set, which means that the charging power detection unit 80 detects the current signal transferred from the first docking terminal 60 and the second docking terminal 62 to the power storage unit 56. There are many ways to detect the current. In this embodiment, the current detection is implemented by the way of combining a micro-resistor and a computing amplifier which is well-known in this field. As shown in FIG. 4, the charging power detection unit 80 comprises a micro-resistor arranged between the first docking terminal 60 and the positive electrode of the power storage unit 56, and a computing amplifier A1 which amplifies the voltage applied to the resistor R24 and transfers the amplified signal to the second signal receiving port RX2. After detecting the voltage applied to the resistor R24 via the second signal receiving port RX2, the microcontroller MCU1 performs corresponding computation to judge the current flowing through the resistor R24 so as to obtain the value of the current transferred from the first docking terminal 60 and the second docking terminal 62 to the power storage unit 56. When detecting that the current value is less than a predetermined current value, the microcontroller MCU1 controls the input power control unit 88 to stop the power transmission from the first docking terminal 60 and the second docking terminal 62 to power storage unit 56 so as to stop the charging process that the docking station 10 charges the robot 50. The predetermined current value is set according to the properties of the power storage unit 56. In this embodiment, the power storage unit 56 is a lead-acid battery, and according to its properties, the predetermined current value is 200 mA.

The input power control unit 88 is used for controlling the power transmission from the first docking terminal 60 and the second docking terminal 62 to the power storage unit 56 according to the control signal sent by the microcontroller MCU1 when the docking station 10 charges the robot 50. In terms of functions, the input power control unit 88 at least can be set as a combination of a driving circuit and an MOSFET, or the combination of a driving circuit and a relay. As shown in FIG. 4, the combination of a driving circuit and the MOSFET is adopted in this embodiment, wherein the MOSFET Q5 is arranged between the first docking terminal 60 and the positive electrode of the power storage unit 56; the driving circuit is set between the first signal transmission port TX2 and the MOSFET; and the driving circuit further comprises a resistor R10 and a resistor R11 for driving the MOSFET, a switch transistor Q4, and a resistor R12 and a resistor R13 for driving the switch transistor Q4. Usually, the microcontroller MCU1 sends the low-level signal via the second signal transmission port TX2 to control the switching-off of the switch transistor Q4 so as to control the switching-off of the MOSFET Q5 and avoid a situation where the control circuit consumes the power of the power storage unit 56. Once receiving the predetermined feedback signal from the first signal receiving port RX1, the microcontroller MCU1 sends the high-level signal via the first signal transmission port TX2 to control the switching-on of the switch transistor Q4 so as to control the switching-on of the MOSFET Q5 and allow the power transmission from the first docking terminal 60 and the second docking terminal 62 to the power storage unit 56, which means allowing the docking station 10 to charge the robot 50. When the charging process starts, the charging power detection unit 80 detects the current transmission from the first docking terminal 60 and the second docking terminal 62 to the power storage unit 56 constantly and transfers the detection signal to the microcontroller MCU1 via the first signal receiving port RX2; once detecting that the current is less than 200 mA, the microcontroller MCU1 sends the low-level signal via the first signal transmission port TX2 to control the switching-off of the switch transistor Q4 so as to control the switching-off of the MOSFET Q5 and stop the power transmission from the first docking terminal 60 and the second docking terminal 62 to the power storage unit 56, which means stopping the charging process that the docking station 10 charges the robot 50.

The storage power detection unit 82 is mainly used for detecting the power of the power storage unit 56 when the robot 50 works and is being charged, and transfers the detection signal to the first signal receiving port RX3; the microcontroller MCU1 judges if the power of the power storage unit 56 exceeds a predetermined value according to the received signal and sends a corresponding control signal according to the judgment results to control the working state of the input power control unit 88. When the robot 50 works, the microcontroller MCU1 controls the robot 50 to return to the docking station 10 while detecting that the power of the power storage unit 56 is lower than a predetermined value; when the robot 50 is being charged, the microcontroller MCU1 sends a stop charging command to the input power storage unit 88 to stop charging the robot 50 when detecting that the power of the power storage unit 56 is higher than a predetermined value. The current power of the power storage unit 56 can be detected by various means, such as measuring the voltage of the power storage unit 56, measuring the discharging current or charging current of the power storage unit 56, or calculating the discharging or charging time. In this embodiment, the means of measuring the voltage of the power storage unit 56 is adopted because it is easy to implement. As shown in FIG. 4, the storage power detection unit 82 comprises a resistor R15 and a resistor R16; the resistor R15 and the resistor R16 are connected in series to form a voltage divider to measure the voltage of the power storage unit 56. The predetermined voltage value during charging and the predetermined voltage value during discharging are correspondingly set according to the characteristics of the power storage unit 56. Preferably, when the robot 50 works, the predetermined voltage value is usually higher than 90% of the nominal voltage of the power storage unit 56, which can ensure that the robot 50 works fully and that the robot 50 can return to the docking station 10 to recharge the power storage unit 56 before the power of the power storage unit 56 is exhausted; and when the robot 50 is being charged, the predetermined voltage value is usually higher than 10% of the nominal voltage of the power storage unit 56. In this embodiment, the power storage unit 56 is a lead-acid battery; the nominal voltage of this kind of battery is 24V, so the predetermined voltage value during work is 21.6V. However, the lead-acid battery usually determines whether to stop charging process or not by means of judging the charging current, so the signal of the storage power detection unit 82 in this embodiment is not used as the condition for judging whether the charging process shall be stopped, and at this moment the predetermined voltage during charging process is not limited.

The forced charging assembly is mainly used for quickly responding to the manual immediately charging demands of a user and transmitting the demands to microcontroller MCU1 in the format of an electric signal. This function can be implemented by various means, such as acoustic sensing, touch sensing, etc. Compared with acoustic sensing, touch sensing is simpler and more convenient and is therefore adopted in this embodiment. Based on touch sensing, the forced charging assembly can be set into a normally-on switch or a trigger switch, preferably the trigger switch. As shown in FIG. 4, one end of the switch SW1 is electrically connected with the negative electrode of the power storage unit 56, and one end is electrically connected with the first signal receiving port RX4 of the robot control unit 76. Usually, the first signal receiving port RX4 is at a high-impedance state; once the user switches on the switch SW1, the first signal receiving port RX4 can receive the low level, and the robot control unit 76 responds to the low level received by the first signal receiving port RX4 to control the robot 50 to return to the docking station 10 so as to charge the power storage unit 56.

A rain detector is used for detecting if the robot 50 is exposed to rain, and if so, transmitting the detected signal to the robot control unit 76; the robot control unit 76 controls the robot 50 to return to the docking station 10 to take a shelter from the rain so as to avoid the rain corroding the robot 50. A rain detector can be implemented by two mutually isolated metal plates, wherein one metal plate is electrically connected with the first signal receiving port RX5 of the microcontroller MCU1, and the other is electrically connected with the negative electrode of the power storage unit 56; when it does not rain, the two metal plates maintain the isolated state, and the first signal receiving port RX5 is suspended; and when it rains, the two metal plates are connected by the rain, the first signal receiving port RX5 receives the low-level signal, and then the microcontroller MCU1 controls the robot 50 to return to the docking station 10 to take shelter from the rain. The two metal plates conduct the function of a switch, and thus a rain detector is illustrated by the switch SW2 as shown in FIG. 4.

The above descriptions include details about the structures, working means and mutual influences of the functional units of the first printed circuit board 58. The following are the detailed descriptions of those of the second printed circuit board 14.

The docking station control unit 28 is mainly used for receiving signals from the signal detection unit 24 and the second power detection unit 26 and controlling the working of the output power control unit 30 according to the signals. Based on the above mentioned functions, the docking station control unit 28 can be set into various forms, such as an analogue circuit, a digital circuit, or the combination of an analogue circuit and a digital circuit. In this embodiment, the docking station control unit 28 is in the format of a microcontroller, namely a microcontroller which is a well-known integrated circuit unit capable of completing related actions to implement corresponding functions by compiling the predetermined program. The microcontroller has many models and can be selected according to the functional demands. In this embodiment, the selected microcontroller has the functions of detection, identification, judgment, generation, and transmission of signals, timing, calculation, etc. To make the expression clear, the microcontroller included in the docking station control unit 28 is a microcontroller MCU2. The microcontroller MCU2 further comprises the second signal receiving ports RX1 and RX2 and a second signal transmission port TX1, wherein the second signal receiving port RX1 is electrically connected with the signal detection unit 24 for receiving the signal transferred from the first signal conversion unit 70; the second signal receiving port RX2 is electrically connected with the second power detection unit 26 for receiving the signal of the power transmission from the power supply unit 20 to the first conductive terminal 16 and the second conductive terminal 18 from the second power detection unit 26; and the second signal transmission port TX1 is electrically connected with the output power control unit 30 for transmitting the control signal to the output power control unit 30 to control the power transmission from the power supply unit 20 to the first conductive terminal 16 and the second conductive terminal 18. The microcontroller MCU2 controls the signal output of the second signal transmission port TX1 according to the signals received by the second signal receiving ports RX1 and RX2.

The signal detection unit 24 is mainly used for detecting the signal flowing through the first conductive terminal 16 and the second conductive terminal 18 and transmitting the detected signal to the docking station control unit 28. To detect the signal flowing through the first conducive terminal 16 and the second conductive terminal 18, the signal detection unit 24 must have a detection part across the first conducive terminal 16 and the second conductive terminal 18 and a transmission part which transfers the signal detected by the detection part to the microcontroller MCU2. Besides, considering that the first conducive terminal 16 and the second conductive terminal 18 both exposed on the housing surface of the docking station 10 may easily come into contact with electrostatic power, and to avoid damage to the internal components caused by the electrostatic power applied to the first conducive terminal 16 and the second conductive terminal 18, the detection part and the transmission part are isolated by an optical coupler. As mentioned above, the across circuit 78 has the function of connecting the first conducive terminal 16 and the second conductive terminal 18. This function is identical with that of the detection part of the signal detection unit 24. To simplify the circuit, the function of the detection part of the signal detection unit 24 is set in the across circuit 78, so the functions of two circuits are implemented by one circuit. As shown in FIG. 4, the across circuit 78 comprises a resistor R2 and a light-emitting part of an optical coupler U2 which are arranged in series between the first conducive terminal 16 and the second conductive terminal 18. The transmission part of the signal detection unit 24 comprises a resistor R1 and a receiving part of the optical coupler U2 which are arranged in series between the working power supply Vdd of the microcontroller MCU2 and the second conductive terminal 18, and a wire is arranged between the joint of the resistor R1 and the receiving part of the optical coupler U2 and the second signal receiving port RX1 of the microcontroller MCU2 to transmit the detected signal to the microcontroller MCU2. The resistor R1 and the receiving part of the optical coupler U2 may also be arranged in series between the other working power supply and the second conductive terminal 18 according to the actual demands. When a signal passes through the first conductive terminal 16, the signal further passes through the across circuit 78 consisting of the resistor R2 and the light-emitting part of the optical coupler U2; if the voltage of the signal is big enough to drive the light-emitting part to emit light, then the light-emitting part will emit light. As known in this field, the voltage value is usually more than or equal to 0.6V. When the signal flowing through the first conductive terminal 16 has a high level, the light-emitting part of the optical coupler U2 emits light, meanwhile the receiving part of the optical coupler U2 receives a light source and is switched on, and thus the microcontroller MCU2 receives a low-level signal from the second conductive terminal 18. When the signal flowing through the cross circuit 78 has a low level, the light-emitting part of the optical coupler U2 does not emit light, meanwhile the receiving part of the optical coupler U2 receives no light source and is then switched off, and thus the microcontroller MCU2 receives a high-level signal from the resistor R1, wherein the voltage amplitude of the high-level signal is equal to the voltage value of the power supply provided on the resistor R1, in this embodiment is VDD. In this embodiment, the working voltage of the microcontroller MCU2 VDD is usually lower than the voltage of the power storage unit 56, so the signal detection unit 24 reduces the signal amplified by the first signal conversion unit 70 and inverts the phase. The working voltage VDD of the microcontroller MCU2 may be identical with or different from the working voltage Vcc of the microcontroller MCU1, and preferably, the VDD is identical with the Vcc.

The second power detection unit 26 is used for detecting the power transmission from the power supply unit 20 to the first conductive terminal 16 and the second conductive terminal 18 and transmitting the detected signal to the docking station control unit 28. When the value of the power detected by the second power detection unit 26 exceeds a predetermined level, the microcontroller MCU2 controls the output power control unit 30 to stop the power transmission from the power supply unit 20 to the first conductive terminal 16 and the second conductive terminal 18 so as to stop the charging process where the docking station 10 charges the robot 50. Power detection can be implemented by detecting the current or the voltage or detecting the current and voltage at the same time. This embodiment only adopts current detection, which means that the second power detection unit 26 detects the current signal from the power supply unit 20 to the first conductive terminal 16 and the second conductive terminal 18. Current detection can be implemented by various means. In this embodiment, the combination of a micro-resistor and a computing amplifier well-known in this field is adopted. As shown in FIG. 4, the second power detection unit 26 comprises a micro-resistor R17 arranged between the power supply unit 20 and the second conductive terminal 18 and a computing amplifier A2 which amplifies the signal applied to the resistor R17 and transfers the amplified signal to the second signal receiving port RX2. The microcontroller MCU2 performs corresponding computation after detecting the voltage applied to the resistor R17 via the second signal receiving port RX2, and judges the current flowing through the resistor R17, and then the value of the current flowing from the power supply unit 20 to the first conductive terminal 16 and the second conductive terminal 18. When detecting that the current value is less than a predetermined current value, the microcontroller MCU2 controls the output power control unit 30 to stop the power transmission from the power supply unit 20 to the first conductive terminal 16 and the second conductive terminal 18 so as to stop the charging process that the docking station 10 charges the robot 50. The predetermined current value is set according to the characteristics of the power storage unit 56. In this embodiment, the power storage unit 56 is a lead-acid battery, so according to its characteristics, the predetermined current value is 200 mA.

The output power control unit 30 has a function of operationally allowing or stopping the power transmission from the power supply unit 20 to the first conductive terminal 16 and the second conductive terminal 18 according to the control signal sent from the microcontroller MCU2. Based on the above mentioned function, the output power control unit 30 at least may be the combination of a driving circuit and a MOSFET or the combination of a driving circuit and a relay. It is well-known in this field that the MOSFET can cut off the power transmission from the power supply unit 20 to the first conductive terminal 16 and the second conductive terminal 18, but there is still a micro-current flowing through the first conductive terminal 16 and the second conductive terminal 18; if the power supply unit 20 is not an isolated power supply, even if there is only a micro-current flowing through the first conductive terminal 16 and the second conductive terminal 18, the human body may be injured because of electric shock if the human body contacts the micro-current. To ensure that that the power transmission from the power supply unit 20 to the first conductive terminal 16 and the second conductive terminal 18 is reliably cut off, and avoid a situation where the first conductive terminal 16 and the second conductive terminal 18 exposed on the outer surface of the docking station 10 may contact the human body and cause injury because of electric shock when the robot 50 is not docked with the docking station 10, the output power control unit 30 is set into the combination of a driving circuit and a relay. As shown in FIG. 4, the output power control unit 30 comprises a driving circuit and a relay coil KM arranged between the positive electrode and negative electrode of the power supply unit 20, a relay switch K1 arranged between the positive electrode of the power supply unit 20 and the first conductive terminal 16, and a relay switch K2 arranged between the negative electrode of the power supply unit 20 and the second conducive terminal 18, wherein the driving circuit further comprises resistors R3 and R4, a switch transistor Q2, and a fly-wheel diode D4 connected with the relay coil KM in parallel. Usually, the switch K1 and the switch K2 are switched off to ensure that the first conductive terminal 16 and the second conductive terminal 18 have no output to avoid injury of human body. Once receiving the predetermined startup signal from the second signal receiving port RX1, the microcontroller MCU2 sends the high-level signal via the second signal transmission port TX1 to switch on the switch transistor Q2; the relay coil KM generates a magnetic force by means of the flowing current to close the switch K1 and the switch K2 to allow the power transmission from the power supply unit 20 to the first conducive terminal 16 and the second conductive terminal 18, which means allowing the docking station 10 to charge the robot 50. After charging process begins, the second power detection unit 26 detects the current transmission from the power supply unit 20 to the first conducive terminal 16 and the second conductive terminal 18 constantly and transfers the detected signal to the microcontroller MCU2 via the second signal receiving port RX2. Once detecting that the current is less than 200 mA, the microcontroller MCU2 sends the low-level signal via the second signal transmission port TX1 to switch off the switch transistor Q2; the relay coil KM loses the magnetic force because of lacking current flow, and the switch k1 and the switch k2 are switched off to stop the power transmission from the power supply unit 20 to the first conducive terminal 16 and the second conductive terminal 18, namely stop the docking station 10 from charging the robot 50.

The power supply unit 20 is used for converting the external power supply into a power supply suitable for the robot 50. The external power supply includes the DC power supply or AC power supply. The power supply suitable for charging the robot 50 is determined according to the electric properties of the power supply unit 56, and usually is the DC power supply. Therefore, if the external power supply is a DC power supply, the power supply unit 20 is only required to adjust the voltage of the DC power supply into the charging voltage suitable for the robot 50. In such circumstance, the power supply unit 20 can be designed into a voltage adjusting circuit. In this field, it is well-known that there are various voltage adjusting circuits, so the details are omitted here. If the external power supply is an AC power supply, the power supply unit 20 can be designed into a circuit in the mode of a switch power supply or in the mode of a transformer to convert the AC power supply into DC power supply suitable for charging the robot 50, or a regular voltage-reduction rectifier circuit can be adopted to convert the external AC power supply into DC power supply suitable for charging the robot 50, wherein the circuit in the mode of the switch power supply or in the mode of the transformer is the isolating circuit well-known in this field. The regular voltage-reduction rectifier circuit is not an isolating circuit which has the advantage of low cost and also has a serious heating problem. The external AC power supply is not isolated and therefore is very dangerous to the human body and easily causes injury due to electric shock.

When the first conductive terminal 16 and the second conductive terminal 18 are respectively in electric connection with the first docking terminal 60 and the second docking terminal 62, the microcontroller MCU1 sends the predetermined detection signal via the first signal transmission port TX1. The amplitude of the predetermined detection signal is Vcc. The predetermined detection signal is converted by the first signal conversion unit 70 into the signal of the amplitude in the voltage of the power supply unit 56, the amplitude is enhanced. The detection signal is converted by the first signal conversion unit 70, which means that the first signal conversion unit 70 amplifies the signal passing there through and further transfers the amplified signal to the first docking terminal 60 and then to the first conductive terminal 16. The first conductive terminal 16 transfers the amplified signal to the second conductive terminal 18 via the across circuit 78. The across circuit 78 includes a resistance component and the power flowing through the cross circuit 78 will be reduced, but other properties are not changed. The second conductive terminal 18 transfers the signal to the second docking terminal 62. The second docking terminal 62 transfers the signal to the second signal conversion unit 72. The second signal conversion unit 72 has a working voltage of Vcc and includes an optical coupler component. After passing through the second conversion unit 72, the signal is converted into the signal with a phase inverted and a working voltage Vcc. The signal converted by the second signal conversion unit 72 is finally transferred to the first signal receiving port RX1 of the microcontroller MCU1 then converted in the above mentioned loop. The predetermined detection signal sent from the microcontroller MCU1 via the first signal transmission port TX1 is finally converted into the predetermined feedback signal with a period identical with that of the detection signal and a phase inverted to that of the detection signal and then returned to the first signal transmission port RX1. During the above mentioned conversion, the signal is amplified or reduced, and the type of the signal is not changed. Then if the predetermined detection signal is a signal varying regularly, the predetermined feedback signal finally generated by conversion in the mentioned loop is a signal varying regularly If the predetermined detection signal is a square wave signal, the predetermined feedback signal finally generated by conversion in the above mentioned loop is a square wave signal without change in the electric parameters, wherein the electric parameters include the amplitude, period, duty ratio, etc. In the conversion of the above mentioned loop, the difference between the predetermined feedback signal finally received by the microcontroller MCU1 and the predetermined detection signal sent by the microcontroller MCU1 is only the inverted phase. After the first signal receiving port RX1 receives the predetermined feedback signal with a period identical with that of the predetermined detection signal, the first conductive terminal 16 and the second conductive terminal 18 are in electric connection with the first docking terminal 60 and the second docking terminal 62 respectively. This means that it can be verified that the docking between the docking terminal group of the robot 50 and the conductive terminal group of the docking station 10 has succeeded. On the contrary, if the first conductive terminal 16 and the second conductive terminal 18 are not in electric connection with the first docking terminal 60 and the second docking terminal 62 respectively, and the microcontroller MCU1 cannot detect the predetermined feedback signal with a period identical with that of the predetermined detection signal, it cannot be verified that the docking between the docking terminal group of the robot 50 and the conductive terminal group of the docking station 10 has succeeded, and the microcontroller MCU1 continuously sends the predetermined detection signal.

Under the condition that the first conductive terminal 16 and the second conductive terminal 18 are in electric connection with the first docking terminal 60 and the second docking terminal 62 respectively, the predetermined feedback signal finally generated after the predetermined detection signal sent from the microcontroller MCU1 via the first signal transmission port TX1 passes through the communication loop including the first signal conversion unit 70, the first docking terminal 60, the first conductive terminal 16, the across circuit 78, the second conductive terminal 18, the second docking terminal 62 and the second conversion unit 72 is returned to the first signal receiving port RX1, while the predetermined detection signal sent via the first signal transmission port TX1 is converted by the first signal conversion unit 70, the first docking terminal 60, the first conductive terminal 16, the across circuit 78 and the transmission part of the signal detection unit 24 into the corresponding predetermined startup signal which is received by the second signal receiving port RX1. The predetermined detection signal is only amplified after passing through the first signal conversion unit 70, the first docking terminal 60, the first conductive terminal 16 and the cross circuit 78. When the amplified signal passes through the across circuit 78, the light-emitting part of the optical coupler U2 located in the across circuit 78 is selected to emit light or not according to the signal level so as to selectively connect the second signal receiving port RX1 and the VDD or not, which is similar to the signal detection unit 24 converts the signal as before mentioned, the signal flowing through the across circuit 78 is finally converted into a signal with an inverted phase and amplitude VDD and then fed back to the second receiving port RX1. In this embodiment, Vcc is identical with VDD, so the predetermined startup signal has an amplitude identical with that of the predetermined detection signal and an inverted phase. By means of the mentioned conversion, the signal is amplified first and then reduced and inverted, so the predetermined startup signal and the predetermined detection signal belong to the same type; if the predetermined detection signal is a signal varying regularly, the predetermined startup signal finally generated by means of conversion is a signal varying regularly; if the predetermined detection signal is a square wave signal, the predetermined startup signal finally generated by means of conversion is a square wave signal. In this embodiment, the predetermined detection signal is a square wave signal with a constant period, so the predetermined startup signal is a square wave signal of which the period is a predetermined value. After detecting the predetermined startup signal, the microcontroller MCU2 verifies that the docking between the docking terminal group of the robot 50 and the conductive terminal group of the docking station 10 has succeeded. Based on the above description, when the microcontroller MCU1 verifies that docking between the docking terminal group of the robot 50 and the conductive terminal group of the docking station 10 has succeeded, the microcontroller MCU2 verifies that docking between the docking terminal group of the robot 50 and the conductive terminal group of the docking station 10 has succeeded.

When verifying that the docking between the docking terminal group of the robot 50 and the conductive terminal group of the docking station 10 has succeeded, the microcontroller MCU1 controls the robot 50 to stop moving. The microcontroller MCU1 may also control the robot 50 to stop moving after verifying the successful docking several times. In the process of verifying the successful docking by several times, the predetermined detection signal sent each time may be identical or different, e.g.: the predetermined detection signal sent each time can be different by changing the frequency of the pulse signal, the duty ratio, etc. Preferably, the microcontroller MCU1 controls the robot 50 to stop moving after verifying that that the docking between the docking terminal group of the robot 50 and the conductive terminal group of the docking station 10 has succeeded only once. After the robot 50 stops moving, the microcontroller MCU1 re-sends the predetermined detection signal, if detecting the predetermined feedback signal corresponding to the re-sent predetermined detection signal, the microcontroller MCU1 verifies that the docking terminal group of the robot 50 and the conductive terminal group of the docking station 10 has succeeded again, and controls the robot 50 to maintain the stop state; if detecting no predetermined feedback signal corresponding to the re-sent predetermined detection signal, the microcontroller MCU1 does not verify that the docking terminal group of the robot 50 and the conductive terminal group of the docking station 10 has succeeded again, and then controls the robot 50 to start to move. In the process of verifying that the docking terminal group of the robot 50 and the conductive terminal group of the docking station 10 has succeeded again after the robot 50 stops moving, the sent predetermined detection signal may be identical with or different from that before the robot 50 stops moving, preferably different to facilitate identification of the microcontroller MCU1. In the process that the microcontroller MCU1 verifying or not verifying that the docking terminal group of the robot 50 and the conductive terminal group of the docking station 10 has succeeded, the microcontroller MCU2 also does the same work. After he microcontroller MCU2 verifying that the docking terminal group of the robot 50 and the conductive terminal group of the docking station 10 has succeeded, the microcontroller MCU2 starts charging process and controls the output power control unit 30 to allow the power transmission from the power supply unit 20 to the first conductive terminal 16 and the second conductive terminal 18. The microcontroller MCU2 can start charging process by making the verification once or twice. If charging process is started by making the verification once, the microcontroller MCU2 preferably makes the verification by detecting the predetermined startup signal corresponding to the predetermined detection signal sent by the microcontroller MCU1 at the second time.

In this embodiment, the predetermined detection signal is finally converted into the corresponding predetermined feedback signal by the first signal conversion unit 70, the first docking terminal 60, the first conductive terminal 16, the across circuit 78, the second conductive terminal 18, the second docking terminal 62 and the second signal conversion unit 72. During the mentioned signal transmission, the first signal conversion unit 70 amplifies the flowing signal; the across circuit 78 does not convert the signal; the second signal conversion unit 72 correspondingly reduces the flowing signal and inverts the phase, so the predetermined feedback signal is a signal identical with the predetermined detection signal in type, amplitude and period and opposite to the predetermined detection signal in phase. The first variation of this embodiment is that: the robot 50 does not have the first signal conversion unit 70 and the second signal conversion unit 72; the predetermined detection signal is converted into the corresponding predetermined feedback signal by the first docking terminal 60, the first conductive terminal 16, the across circuit 78, the second conductive terminal 18, and the second docking terminal 62. In this case, the predetermined feedback signal and the predetermined detection signals are signals with all the same parameters. Another variation of this embodiment is that: the robot 50 is provided with either the first signal conversion unit 70 or the second signal conversion unit 72; the predetermined detection signal is converted into the corresponding predetermined feedback signal by the first docking terminal 60, the first conductive terminal 16, the cross circuit 78, the second conductive terminal 18, the second docking terminal 62 and either the first signal conversion unit 70 or the second signal conversion unit 72; either the first signal conversion unit 70 or the second signal conversion unit 72 amplifies or reduces the signal or changes the signal type. In this case, the feedback signal can be preset in the MCU2 according to the signal conversion carried out by either the first signal conversion unit 70 or the second signal conversion unit 72, in which the details of this way are well-known in the field and therefore are omitted here. This embodiment also has many other variations. For example, the robot 50 is provided with both first signal conversion unit 70 and the second signal conversion unit 72, but the first signal conversion unit 70 reduces the signal, changes the signal type or others, while the second signal conversion unit 72 also carries out the corresponding conversion, in which the details are omitted here.

In this embodiment, the predetermined detection signal is finally converted into the corresponding predetermined startup signal by the first signal conversion unit 70, the first docking terminal 60, the first conductive terminal 16, the second conductive terminal 18, and the signal detection unit 24. This embodiment also has many other variations. For example, the docking station 10 is not provided with the signal detection unit 24, or the signal detection unit 24 changes the type of the flowing signal or makes corresponding change according to the conversion carried out by the first signal conversion unit 70, wherein the basic method is the same as the conversion carried out by the first signal conversion unit 70 and the second signal conversion unit 72 and therefore is omitted here.

In the mentioned embodiment, the case where the microcontroller MCU1 sends the signal via the first docking terminal 60 and receives the signal via the second docking terminal 62 is described. The following is the case where the microcontroller MCU1 sends the signal via the second docking terminal 62 and receives the signal via the first docking terminal 60; compared with the previous one, this case has the following differences: the first signal conversion unit 70 is in electric connection with the second docking terminal 62; the second signal conversion unit 72 is in electric connection with the first docking terminal 60; meanwhile, the electric connection between the across circuit 78 and the first conductive terminal 16 and the second conductive terminal 18 are opposite in direction. Except for reversely connecting the across circuit 78, a signal detection unit 24 can be added to instead of reversely connecting the across circuit 78. The added signal detection unit 24 is also in electric connection with the microcontroller MCU2 and is only different from the previous signal detection unit 24 in that the direction of the electric connection between the across circuit 78 and the first conductive terminal 16 and the second conductive terminal 18 is opposite to that in the previous case. Thus, the signal entering the docking station 10 from the first conductive terminal 16 or the second conductive terminal 18 can be detected by the microcontroller MCU2, wherein this way is well-known to those skilled in this field and therefore is omitted here. It is known from the variations of the mentioned embodiments, the first conductive terminal 16 and the second conductive terminal 18 may not be respectively connected with the first docking terminal 60 and the second docking terminal 62, which means that if the first conductive terminal 16 is docked with the first docking terminal 60 and the second conductive terminal 18 is docked with the second docking terminal 62, then the microcontroller MCU1 and the microcontroller MCU2 may verify that the docking between the docking terminal group of the robot 50 and the docking station 10 has succeeded; and if the first conductive terminal 16 is docked with the second docking terminal 62, and the second conductive terminal 18 is docked with the first docking terminal 60, then the microcontroller MCU1 and the microcontroller MCU2 may also verify that the docking between the docking terminal group of the robot 50 and the docking station 10 has succeeded.

The functions, structures and mutual influences of each functional unit of the second printed circuit board 14 and the first printed circuit board 58 are described in detail with the reference drawings. The following are the detailed description of the docking process and charging process of the robot 50 and the docking station 10 with the reference of the workflow charts of the microcontroller MCU1 and the microcontroller MCU2.

Figure 6:
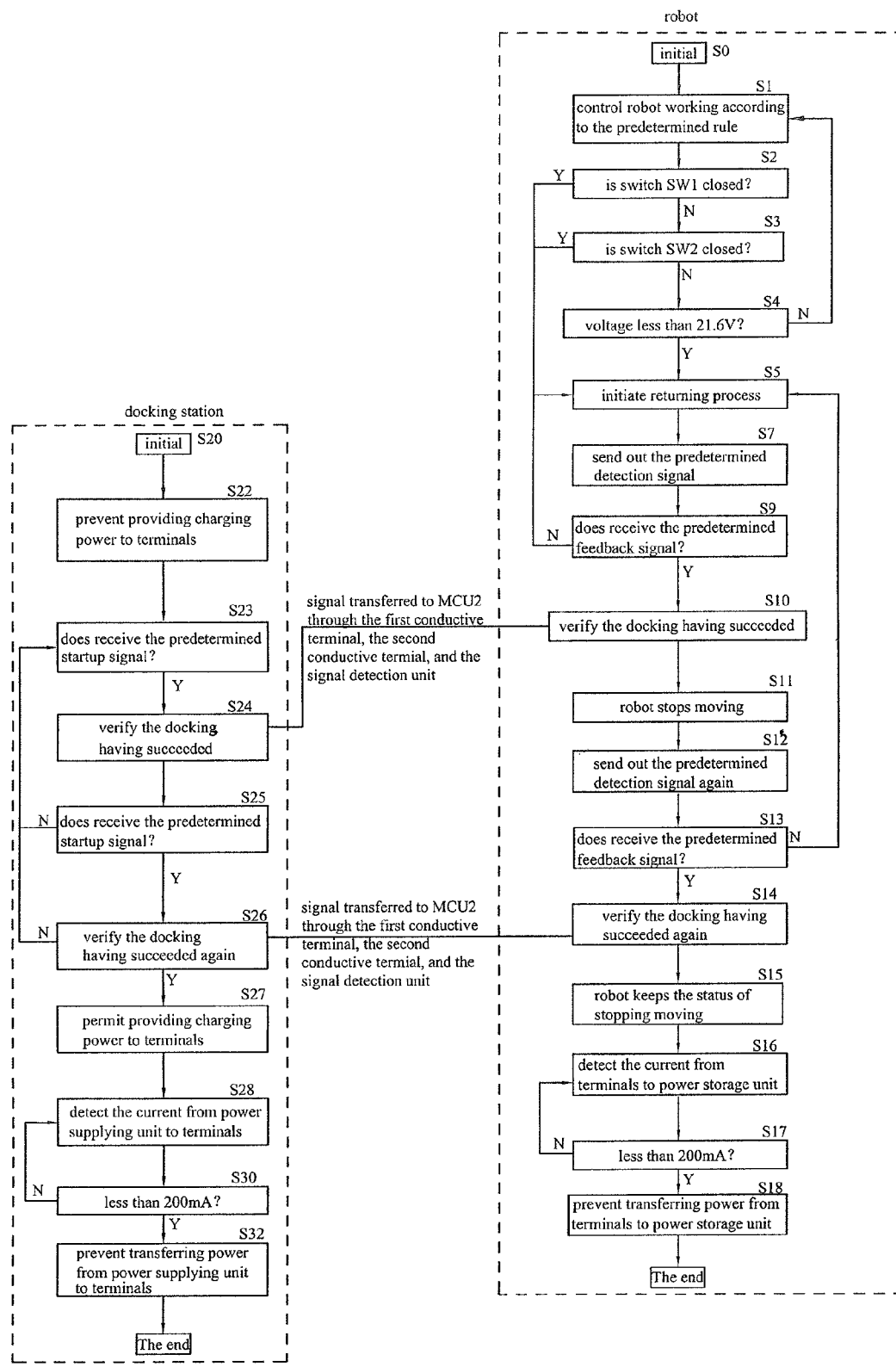
FIG. 6 is a workflow chart of the docking of a robot and a docking station.

As shown in FIG. 6, the flowchart includes two parts, wherein the left part is the workflow chart of the microcontroller MCU2 in the docking station 10, and the right part is the workflow chart of the microcontroller MCU1 in the robot 50.

After the robot 50 starts to work, the microcontroller MCU1 enters step S0 to initial. After the initiation, the microcontroller MCU1 controls the robot 50 to work in the working area 102 defined by the boundary wire 100 according to the predetermined rules, as shown in step S1; the microcontroller MCU1 enters the step S2 to detect if the switch SW1 is switched on and judge if the user sends a charging command via the forced charging assembly, and if the judgment result is yes, it enters the step S5; otherwise, the microcontroller MCU1 enters step S3 to detect if the switch SW2 is switched on and judges if it is exposed to rain, and if the judgment result is yes, it enters step S5; otherwise, the microcontroller MCU1 enters step S4 to detect if the voltage value of the power storage unit 56 is lower than 21.6V via the storage power detection unit 82, which means that if the current power of the power storage unit 56 is lower than the predetermined value; in the step S4, if the judgment result is no, returns to step S1, otherwise, the microcontroller MCU1 enters step S5 to start the returning process and control the robot 50 to return to the docking station 10; during the returning process, the microcontroller MCU1 enters step S7 to send the predetermined detection signal; after sending the predetermined detection signal, the microcontroller MCU1 enters step S9 to judge if the predetermined feedback signal corresponding to the predetermined detection signal is received, and if the judgment result is no, enters step S5; otherwise, the microcontroller MCU1 enters step 10 to verify that the docking between the docking terminal group of the robot 50 and the conductive terminal group of the docking station 10 has succeeded; then the microcontroller MCU1 enters step S11 to control the robot 50 to stop moving and then enters step S12 to send the predetermined detection signal again; the microcontroller MCU1 enters step S13 to judge if the predetermined feedback signal corresponding to the predetermined detection signal is received again; if the judgment result is no, which means that the docking terminal group of the robot 50 and the conductive terminal group of the docking station 10 does not succeed again, the microcontroller MCU1 returns to step S5 to control the robot 50 to start moving and try to dock to the docking station again, and if the judgment result is yes, which means that it can be verified that the docking terminal group of the robot 50 and the conductive terminal group of the docking station 10 has succeeded again; the microcontroller MCU1 enters step S14 to verify that docking terminal group of the robot 50 and the conductive terminal group of the docking station 10 has succeeded again; and then microcontroller MCU1 enters step S15 to keep the robot 50 stopped and wait for the docking station 10 to start charging process.

After the docking station 10 is connected with the external power supply, the microcontroller MCU2 initials, as shown in step S20; the microcontroller MCU2 enters step S22 to stop the power transmission from the power supply unit 20 to the first conductive terminal 16 and the second conductive terminal 18; the microcontroller MCU2 enters step S23 to detect if the predetermined startup signal is received, and when the conductive terminal group is electrically connected with the docking terminal group, the predetermined detection signal sent by the microcontroller MCU1 is received by the microcontroller MCU2 after passing through the signal detection unit 24 and also is received by the microcontroller MCU2 at the same time; in step S24, the microcontroller MCU2 verifies that the docking between the docking terminal group of the robot 50 and the conductive terminal group of the docking station 10 has succeeded after detecting the predetermined startup signal; in step S25, the microcontroller MCU2 does not act, but continuously detects if the predetermined startup signal is received again, and if the predetermined startup signal is received again, enters step S26 to verify that the docking between the docking terminal group of the robot 50 and the conductive terminal group of the docking station 10 has succeeded again; in step S27, the docking station 10 starts charging process to control the output power control unit 30 to allow the power transmission from the power supply unit 20 to the first conductive terminal 16 and the second conductive terminal 18; in step S25, if the predetermined startup signal is not received again, the microcontroller MCU2 enters step S23 to continuously detect if the predetermined startup signal is received, wherein the microcontroller MCU2 may exclude step S23 and step 24, and the aim of setting those two steps is to strengthen the anti-interference performance of the microcontroller MCU2 when starting charging process;

After the docking station 10 starts charging process, the microcontroller MCU2 enters step S27 to control the output power control unit 30 to allow the power transmission from the power supply unit 20 to the first conductive terminal 16 and the second conductive terminal 18; the microcontroller MCU2 enters step S28 to detect the current transferred from the power supply unit 20 to the first conductive terminal 16 and the second conductive terminal 18 by the second energy detection unit 26; next, the microcontroller MCU2 enters step S30 to judge if the current is less than 200 mA, and if the judgment result is no, returns to step S28; if the judgment result is yes, the microcontroller MCU2 enters step S32 to control the output power control unit 30 to stop the power transmission from the power supply unit 20 to the first conductive terminal 16 and the second conductive terminal 18 so as to stop the charging process that the docking station 10 charges the robot 50. Both microcontroller MCU2 and microcontroller MCU1 detect and control the charging process. As shown in FIG. 6, in step S16, after verifying that the docking between the docking terminal group of the robot 50 and the conductive terminal group of the docking station 10 has succeeded, the microcontroller MCU1 detects the current transferred from the first docking terminal 60 and the second docking terminal 62 to the power storage unit 56; in next step S17, the microcontroller MCU1 further judges if the current is less than the predetermined value 200 mA, if no, it returns to step S16, and if yes, it stops the power transmission from the first docking terminal 60 and the second docking terminal 62 to the power storage unit 56 by the input power control unit 88 so as to stop the docking station 10 from charging the robot 50, as shown in step S18.

It should be noted that: the robot 50 and the docking station 10 are respectively provided with a charging power detection unit 80 and a second power detection unit 26 inside to detect the charging current, and a robot control unit 76 and a docking station control unit 28 inside for judging if the charging process needs to continue according to the charging current. The charging power detection unit 80 is set closer the power storage unit 56, so the detection result is more precise in comparison with the second power detection unit 26. To prevent overcharging, the robot 50 must be provided with a charging power detection unit 80 inside. Under the condition of keeping the first conductive terminal 16 and the second conductive terminal 18 in corresponding electric connection with the first docking terminal 60 and the second docking terminal 62, the microcontroller MCU1 detects that the charging current is less than 200 mA prior to the microcontroller MCU2; then after the microcontroller MCU1 controls the input power control unit 88 to stop the power transmission from the first docking terminal 60 and the second docking terminal 62 to the power storage unit 56, the power transmission from the first docking terminal 60 and the second docking terminal 62 to the power storage unit 56 is cut off, then the microcontroller MCU2 detects if the current transferred from the power supply unit 20 to the first conductive terminal 16 and the second conductive terminal 18 is less than 200 mA and therefore also controls the output power control unit 30 to stop the power transmission from the power supply unit 20 to the first conductive terminal 16 and the second conductive terminal 18. The docking station 10 is also provided with a charging current detection unit and a power control unit to overcome the injury in a situation where the one or two groups of terminals of the first conductive terminal 16 and the second conductive terminal 18, the first docking terminal 60 and the second docking terminal 62 of the docking station 10 and the robot 50 are separated from each other. When the above mentioned situation occurs during charging process because of an accident, if the docking station 10 does not have the function of stopping the power transmission from the power supply unit 20 to the first conductive terminal 16 and the second conductive terminal 18, the human body will be injured by electric shock if the human body contacts the first conductive terminal 16 or the second conductive terminal 18. Therefore, the microcontroller MCU2 shall stop the power transmission from the power supply unit 20 to the first conductive terminal 16 and the second conductive terminal 18 to effectively guard the human body against the injury due to electric shock caused by contacting the first conductive terminal 16 or the second conductive terminal 18.

In this invention, the robot 50 may be a lawn mower, a dust collector, an industrial robot, etc. If the robot 50 is a lawn mower, it further includes a cutting assembly; the cutting assembly comprises a cutting motor 52 and a cutting blade; and when the lawn mower works in the working area 102 defined by the boundary line 100, the cutting motor 52 drives the cutting blade to rotate to cut grass.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A docking system comprising:
    a robot and a docking station,
    wherein said robot includes
    a power storage unit configured to supply power for the robot,
    a docking terminal group including a first docking terminal and a second docking terminal;
    a robot control unit configured to control a working state of said robot;
    wherein said docking station includes
    a conductive terminal group, including a first conductive terminal and a second conductive terminal,
    said conductive terminal group configured to be electrically connected to the docking terminal group respectively;
    wherein said robot control unit includes
    a signal transmission module configured to be electrically connected to said first docking terminal and send a predetermined detection signal;
    a signal receiving module configured to be electrically connected to said second docking terminal;
    wherein said robot control unit verifies docking of said docking terminal group of said robot with said conductive terminal group of said docking station responsive to receipt by said signal receiving module of a predetermined feedback signal corresponding to the predetermined detection signal transmitted by the signal transmission module to at least one terminal of the docking terminal group.

2. The docking system of claim 1, wherein said robot also includes at least one of a first signal conversion unit and a second signal conversion unit, said first signal conversion unit positioned between said signal transmission module and said first docking terminal, said second signal conversion unit positioned between said signal receiving module and said second docking terminal, said first signal conversion unit operable to modify electrical parameters of the predetermined detection signal;
    said second signal conversion unit operable to modify electrical parameters of the predetermined feedback signal received from the second docking terminal.

3. The docking system of claim 2, wherein said robot includes said first signal conversion unit and said second signal conversion unit, said first signal conversion unit amplifying the predetermined detection signal, said second signal conversion unit decreasing the predetermined feedback signal.

4. The docking system of claim 3, wherein said second signal conversion unit isolates the predetermined feedback signal transferred between said second docking terminal and said signal receiving module.

5. The docking system of claim 1, wherein after said robot control unit verifies docking of said docking terminal group in said robot and said conductive terminal group in said docking station, said robot control unit stops the robot from moving.

6. The docking system of claim 5, wherein after said robot stops moving, said signal transmission module transmits a second predetermined detection signal, and further when said signal receiving module receives a second predetermined feedback signal corresponding to said second predetermined detection signal, said robot control unit keeps the robot from moving, and if said signal receiving module does not receive the second predetermined feedback signal corresponding to said second predetermined detection signal, said robot control unit allows said robot to move.

7. The docking system of claim 1, wherein said docking station further includes an across circuit between said first conductive terminal and said second conductive terminal, said across circuit transfers signal between said first conductive terminal and said second conductive terminal.

8. The docking system of claim 1, wherein said docking station further includes a docking station control unit, said docking station control unit controlling a working state of said docking station and detecting a signal transferred between said first conductive terminal and said second conductive terminal, and when the docking station control unit detects a predetermined startup signal corresponding to said predetermined detection signal, the docking station control unit begins a charging process.

9. The docking system of claim 8, wherein said docking station also includes a signal detecting unit which is electronically connected between said docking station control unit and said first and second conductive terminals, said docking station control unit detecting signals transferred between said first conductive terminal and said second conductive terminal through said signal detecting unit.

10. The docking system of claim 9, wherein said signal detecting unit modifies electrical parameters of the detected signals.

11. The docking system of claim 10, wherein said signal detecting unit isolates the detected signals transferred between said first and second conductive terminals.

12. The docking system of claim 8, wherein said docking station also includes an output power control unit which controls providing a charging power to said first conductive terminal and said second conductive terminal, and wherein, before beginning the charging process, said docking station control unit controls said output power control unit to remove charging power to said first conductive terminal and said second conductive terminal, thereby causing the output power of said first conductive terminal and said second conductive terminal to be zero, and, after beginning the charging process, said docking station control unit controls said output power control unit to supply charging power to said first conductive terminal and said second conductive terminal.

13. A docking method for docking a robot to a docking station, said robot comprising a docking terminal group and a robot control unit, said docking terminal group comprising at least a first docking terminal and a second docking terminal, said robot control unit comprising a signal transmission module configured to be electrically connected to said first docking terminal and a signal receiving module configured to be electrically connected to said second docking terminal, said docking station comprising a conductive terminal group, said conductive terminal group comprising at least a first conductive terminal and a second conductive terminal, said conductive terminal group configured to be electrically connected to said docking terminal group of the robot, said docking method comprising:

sending from said signal transmission module a predetermined detection signal through at least one terminal of the docking terminal group to be received by at least one terminal of the conductive terminal group;

transferring a predetermined feedback signal to the at least one terminal of the docking terminal group of the robot from the docking station;

determining if said signal receiving module has received the predetermined feedback signal corresponding to said predetermined detection signal;

verifying that the docking of said docking terminal group in said robot with said conductive terminal group in said docking station has succeeded when said signal receiving module has received the predetermined feedback signal corresponding to said predetermined detection signal.

14. The docking method of claim 13, wherein a first signal conversion unit and a second signal conversion unit is in said robot, said first signal conversion unit electronically positioned between said signal transmission module and said first docking terminal, said second signal conversion unit is electronically positioned between said signal receiving module and said second docking terminal, said first signal conversion unit altering electrical parameters of the predetermined detection signal; and the second signal conversation unit altering electrical parameters of the predetermined feedback signal.

15. The docking method of claim 14, said first signal conversion unit and said second signal conversion unit in electrical communication with the docking terminal group in said robot, said first signal conversion unit amplifying the predetermined detection signal, said second signal conversion unit decreasing the predetermined feedback signal.

16. The docking method of claim 15, wherein said second signal conversation unit isolates the predetermined feedback signal transferred between said second docking terminal and said signal receiving module.

17. The docking method of claim 13, wherein after verifying docking of said docking terminal group in said robot and said conductive terminal in said docking station has succeeded, stopping said robot.

18. The docking method of claim 17, further including after said robot stops moving, sending by said signal transmission module a predetermined detection signal and, if said signal receiving module receives a predetermined feedback signal corresponding to said predetermined detection signal, keeping the robot stopped by the robot control unit, and if said signal receiving module does not receive a predetermined feedback signal corresponding to said predetermined detection signal, said robot control unit allowing said robot to move.

19. The docking method of claim 13, wherein an across circuit is positioned between said first conductive terminal and said second conductive, said across circuit transfers transferring signals between said first conductive terminal and said second conductive terminal.

20. The docking method of claim 13, wherein a docking station control unit is in said docking station, said docking station control unit controlling a working state of said docking station and detecting signals transferred between said first conductive terminal and said second conductive terminal, such that when the docking station control unit detects a predetermined startup signal corresponding to said predetermined detection signal, said docking station control unit begins a charging process.

* * * * *